(12) United States Patent
Mitarai et al.

(10) Patent No.: US 7,480,584 B2
(45) Date of Patent: Jan. 20, 2009

(54) CODING METHOD AND APPARATUS, AND COMPUTER PROGRAM AND COMPUTER-READABLE STORAGE MEDIUM

(75) Inventors: Yusuke Mitarai, Tokyo (JP); Masakazu Matsugu, Kanagawa-ken (JP); Katsuhiko Mori, Kanagawa-ken (JP); Takashi Morie, Hiroshima-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 10/580,327

(22) PCT Filed: Jan. 24, 2005

(86) PCT No.: PCT/JP2005/001289

§ 371 (c)(1),
(2), (4) Date: May 24, 2006

(87) PCT Pub. No.: WO2005/074145

PCT Pub. Date: Aug. 11, 2005

(65) Prior Publication Data
US 2007/0162828 A1    Jul. 12, 2007

(30) Foreign Application Priority Data
Jan. 30, 2004  (JP) .............................. 2004-024485
Aug. 19, 2004  (JP) .............................. 2004-239792

(51) Int. Cl.
*G01D 1/00*    (2006.01)
*G06F 15/00*   (2006.01)
*G06M 11/04*   (2006.01)

(52) U.S. Cl. .................................................. 702/127

(58) Field of Classification Search ................. 702/127
See application file for complete search history.

(56) References Cited

U.S. PATENT DOCUMENTS 5,153,925 A * 10/1992 Tanioka et al. .............. 382/272
5,978,758 A    11/1999 Ono ............................ 704/222
6,519,545 B1 *  2/2003 Amano ....................... 702/127

(Continued)

FOREIGN PATENT DOCUMENTS

EP    1043663 A1    11/2000

(Continued)

OTHER PUBLICATIONS

Y. LeCun et al., "Convolutional Networks for Images, Speech, and Time Series", The Handbook of Brain Theory and Neural Networks, The MIT Press, pp. 255-258, 1995.

*Primary Examiner*—Joseph D Torres
(74) *Attorney, Agent, or Firm*—Fitzpatrick, Cella, Harper & Scinto

(57) ABSTRACT

Data in multidimensional space such as a two-dimensional image is encoded with high efficiency. Further, as two-dimensional data can be decomposed to one-dimensional bases, the problem of wiring for two-dimensional parallelizing in a convolution arithmetic unit can be solved. For this purpose, two-dimensional image data f(x,y) to be encoded is inputted, and one-dimensional adaptive bases X(x),Y(y) representing the two-dimensional image are obtained. Next, a reconstructed image is generated based on the one-dimensional adaptive bases, and the one-dimensional adaptive bases are corrected based on an error E between the reconstructed image and the input image. The correction is repeated until the error E is reduced.

9 Claims, 29 Drawing Sheets

U.S. PATENT DOCUMENTS 6,714,687 B2    3/2004   Itagaki et al. ............... 382/251
2001/0051005 A1  12/2001  Itagaki et al. ............... 382/250

FOREIGN PATENT DOCUMENTS

| | | |
|---|---|---|
| EP | 1156679 | 11/2001 |
| JP | 6-237179 | 8/1994 |
| JP | 8-212193 | 8/1996 |
| JP | 10-28058 | 1/1998 |
| JP | 11-331852 | 11/1999 |
| JP | 3203609 B2 | 6/2001 |
| JP | 2001-326935 | 11/2001 |
| KR | 2001104610 A | 11/2001 |
| WO | WO 99/32992 A1 | 7/1999 |

\* cited by examiner

| 136 | 79  | 28  | 76  | 109 | 37  | 46  | 92  |
|-----|-----|-----|-----|-----|-----|-----|-----|
| 141 | 79  | 38  | 122 | 117 | 64  | 46  | 78  |
| 140 | 104 | 40  | 101 | 122 | 83  | 45  | 54  |
| 143 | 102 | 33  | 69  | 109 | 109 | 44  | 54  |
| 165 | 135 | 117 | 115 | 124 | 132 | 106 | 41  |
| 167 | 163 | 162 | 163 | 149 | 144 | 134 | 53  |
| 173 | 170 | 169 | 172 | 171 | 169 | 153 | 93  |
| 174 | 174 | 176 | 174 | 169 | 155 | 147 | 127 |

FIG. 11

| $X_1(x)_{(t=0)}$ | 0.1 | 0 | 0 | 0 | 0 | 0 | 0 | 0 | 0 |
|---|---|---|---|---|---|---|---|---|---|
| $Y_1(y)_{(t=0)}$ | 0 | 0 | 0 | 0 | 0 | 0 | 0 | 0 | 0 |

FIG. 12

$\tilde{f}_1(x,y)_{(t=0)} = X_1(x)_{(t=0)} \cdot Y_1(y)_{(t=0)}$

FIG. 13

| $\Delta X_0(x)_{(t=1)}$ | 0 | 0 | 0 | 0 | 0 | 0 | 0 |
|---|---|---|---|---|---|---|---|
| $\Delta Y_0(y)_{(t=1)}$ | 0.0106 | 0.011 | 0.0109 | 0.0112 | 0.0129 | 0.0135 | 0.0135 | 0.0136 |

FIG. 14

| | | | | | | | |
|---|---|---|---|---|---|---|---|
| $X_0(x)_{(t=1)}$ | 0.1 | 0 | 0 | 0 | 0 | 0 | 0 |
| $Y_0(y)_{(t=1)}$ | 0.0108 | 0.011 | 0.0109 | 0.0112 | 0.0129 | 0.0135 | 0.0135 | 0.0136 |

FIG. 15

| | | | | | | | |
|---|---|---|---|---|---|---|---|
| $\Delta X_0(x)_{(t=2)}$ | 0.0118 | 0.0098 | 0.0077 | 0.0096 | 0.0103 | 0.0087 | 0.0072 | 0.0057 |
| $\Delta Y_0(y)_{(t=2)}$ | 0.0193 | 0.0205 | 0.0204 | 0.0208 | 0.0248 | 0.0264 | 0.0279 | 0.0281 |

F I G. 16

| $\Delta X_0(x)_{(t=9)}$ | 6.0845 | 5.228 | 4.3387 | 5.16 | 5.3904 | 4.7233 | 3.9623 | 2.9586 |
|---|---|---|---|---|---|---|---|---|
| $\Delta Y_0(y)_{(t=9)}$ | 4.3238 | 4.9659 | 5.0631 | 4.8601 | 6.7611 | 8.1312 | 8.9774 | 9.076 |

FIG. 18

| $X_0(x)_{(t\to\infty)}$ | 9.3141 | 7.9686 | 6.6163 | 7.8649 | 8.2146 | 7.2 | 6.0413 | 4.5084 |
|---|---|---|---|---|---|---|---|---|
| $Y_0(y)_{(t\to\infty)}$ | 10.494 | 12.0484 | 12.2836 | 11.7937 | 16.4004 | 19.7151 | 21.7626 | 22.0012 |

FIG. 19

$\tilde{f}_0(x,y)_{(t\to\infty)} = X_0(x)_{(t\to\infty)} \cdot Y_0(y)_{(t\to\infty)}$

| | | | | | | |
|---|---|---|---|---|---|---|
| 97.7422 | 83.6225 | 69.4315 | 82.5343 | 86.204 | 75.5568 | 63.3974 | 47.3111 |
| 112.22 | 96.0089 | 79.7158 | 94.7595 | 98.9728 | 86.7485 | 72.788 | 54.319 |
| 114.4107 | 97.8831 | 81.272 | 96.6093 | 100.9049 | 88.4419 | 74.2089 | 55.3794 |
| 109.8477 | 93.9793 | 78.0307 | 92.7563 | 96.8805 | 84.9146 | 71.2493 | 53.1707 |
| 152.755 | 130.6882 | 108.51 | 128.9875 | 134.7227 | 118.0829 | 99.0797 | 73.8396 |
| 183.6284 | 157.1017 | 130.441 | 155.0573 | 161.9517 | 141.9487 | 119.1048 | 88.8836 |
| 202.699 | 173.4175 | 143.9879 | 171.1607 | 178.7711 | 156.6907 | 131.4744 | 98.1145 |
| 204.9214 | 175.3188 | 145.5665 | 173.0372 | 180.7311 | 158.4086 | 132.9158 | 99.1902 |

FIG. 20

$f_1(x,y) = f(x,y) - \bar{f}_0(x,y)|_{(t\to\infty)}$

| 38.2578 | -4.6225 | -41.4315 | -6.5343 | 22.798 | -38.5568 | -17.3974 | 44.6889 |
| --- | --- | --- | --- | --- | --- | --- | --- |
| 28.78 | -17.0089 | -41.7158 | 27.2405 | 18.0272 | -22.7485 | -26.788 | 23.681 |
| 25.5893 | 6.1169 | -41.272 | 4.3907 | 21.0951 | -5.4419 | -29.2089 | -1.3794 |
| 33.1523 | 8.0207 | -45.0307 | -23.7563 | 12.1195 | 24.0854 | -27.2493 | 0.8293 |
| 12.245 | 4.3118 | 8.49 | -13.9875 | -10.7227 | 13.9171 | 6.9203 | -32.9396 |
| -16.6284 | 5.8983 | 31.559 | 7.9427 | -12.9517 | 2.0513 | 14.8952 | -35.8836 |
| -29.699 | -3.4175 | 25.0121 | 0.8393 | -7.7711 | 12.3093 | 21.5256 | -5.1145 |
| -30.9214 | -1.3188 | 30.4335 | 0.9628 | -11.7311 | -3.4086 | 14.0842 | 27.8098 |

FIG. 21

| $\Delta X_1(x)_{(t=1)}$ | 0 | 0 | 0 | 0 | 0 | 0 | 0 | 0 |
|---|---|---|---|---|---|---|---|---|
| $\Delta Y_1(y)_{(t=1)}$ | 0.003 | 0.0022 | 0.002 | 0.0026 | 0.001 | -0.0013 | -0.0023 | -0.0024 |

F I G. 22

| | | | | | | | |
|---|---|---|---|---|---|---|---|
| $\Delta X_j(x)_{(t=2)}$ | 0.0004 | -8.9691 | -0.0005 | -3.0473 | 0.0002 | -9.7318 | -0.0003 | 0.0001 |
| $\Delta Y_j(y)_{(t=2)}$ | 0.0042 | 0.0031 | 0.0028 | 0.0037 | 0.0013 | -0.0018 | -0.0033 | -0.0034 |

FIG. 23

| | | | | | | | |
|---|---|---|---|---|---|---|---|
| $X_0(x)_{(t\to\infty)}$ | 9.314059 | 7.968558 | 6.616251 | 7.864916 | 8.214631 | 7.200042 | 6.041299 | 4.508398 |
| $Y_0(y)_{(t\to\infty)}$ | 10.49404 | 12.04839 | 12.28356 | 11.79374 | 16.4004 | 19.71507 | 21.76265 | 22.00115 |
| $X_1(x)_{(t\to\infty)}$ | 5.855984 | -0.47626 | -7.69964 | 0.047947 | 3.368921 | -2.28737 | -4.5027 | 3.50781 |
| $Y_1(y)_{(t\to\infty)}$ | 6.61005 | 5.70475 | 4.722223 | 4.527204 | -1.47624 | -4.08533 | -3.73539 | -2.88403 |
| $X_2(x)_{(t\to\infty)}$ | 2.526245 | 1.695333 | -1.70869 | -2.36103 | -0.26453 | 4.25259 | -1.22741 | -6.25392 |
| $Y_2(y)_{(t\to\infty)}$ | -3.30739 | -2.16792 | 1.972279 | 4.676515 | 4.133266 | 1.484439 | -0.85693 | -4.40687 |
| $X_3(x)_{(t\to\infty)}$ | 0.619973 | -1.05835 | 0.174089 | 4.68368 | 0.360208 | -2.66006 | -0.4968 | -3.57879 |
| $Y_3(y)_{(t\to\infty)}$ | -1.13664 | 3.46946 | 1.470049 | -3.5713 | 0.287339 | 3.133781 | -0.78771 | -2.50734 |
| $f_{decode}(x,y) = \sum_{n=0}^{3}[X_n(x)_{(t\to\infty)} \cdot Y_n(y)_{(t\to\infty)}]$ | 127.3904 | 76.07 | 23.9896 | 85.3368 | 108.9388 | 49.3964 | 38.2588 | 95.2501 |
| | 142.3006 | 85.9441 | 40.0989 | 116.4015 | 120.0151 | 55.2518 | 48.0385 | 75.4716 |
| | 147.9589 | 97.4211 | 41.7976 | 99.0642 | 116.8215 | 82.1176 | 49.7948 | 54.3438 |
| | 145.9587 | 103.5309 | 34.5601 | 65.2056 | 109.6095 | 103.9472 | 46.8991 | 52.5858 |
| | 154.7292 | 138.0938 | 112.8633 | 120.504 | 128.76 | 138.273 | 100.5108 | 41.8837 |
| | 165.3866 | 158.2463 | 159.9045 | 166.0343 | 148.925 | 149.2706 | 134.1207 | 54.0541 |
| | 178.171 | 174.5768 | 174.0754 | 169.3161 | 166.1308 | 163.6874 | 149.7371 | 93.1699 |
| | 175.3439 | 171.8735 | 174.8646 | 171.5601 | 171.2779 | 152.9351 | 152.5561 | 125.6088 |

FIG. 29

| $Q_x(x), Q_y(y)$ | 0.3 | 0.6 | 0.6 | 1.2 | 1.5 | 1.8 | 2.1 | 2.4 |

# CODING METHOD AND APPARATUS, AND COMPUTER PROGRAM AND COMPUTER-READABLE STORAGE MEDIUM This application is a National Stage Filing Under 35 U.S.C. § 371 of International Application No. PCT/JP2005/001289, filed Jan. 24, 2005, and published in English as International Publication No. WO 2005/074145 A1, Aug. 11, 2005, which claims priority to Japanese Patent Application Nos. 2004-024485 and 2004-23972, filed on Jan. 30, 2004 and Aug. 19, 2004, respectively, each of which is incorporated by reference herein.

TECHNICAL FIELD

The present invention relates to data coding, and more particularly, to a coding technique for encoding distribution data in multidimensional space such as a two-dimensional image and three-dimensional density distribution data.

BACKGROUND ART

As a general technique for encoding multidimensional distribution data such as a two-dimensional image, a data amount compression technique such as a JPEG compression technique is known. Two-dimensional image data is subjected to discrete cosine transform then quantization, and encoding by the Huffman coding or the like.

Further, a method for predictive-encoding image data, block-dividing prediction error data by the predictive coding, and determining whether or not each block has a large amount of prediction error or small amount of prediction error is known (for example, Japanese Patent Application Laid-Open No. Hei 11-331852). According to the method disclosed by the document, vector quantization is applied to a block with a large amount of prediction error, then the difference value between a vector value of a codebook retrieved by the vector quantization and the prediction error is calculated, then the difference value and the prediction error in a block with a small amount of prediction error are entropy-encoded, and coded data is generated by using the entropy code, a block error-amount discrimination flag and an index by vector quantization. In this manner, from the viewpoint of space-saving data conservation and high-speed communication, a high efficiency data coding technique is desired.

Further, in an arithmetic unit to perform discrete convolution on a two-dimensional image represented by predetermined two-dimensional weight distribution data, which is frequently used in image processing such as filtering, accelerated computation is expected by use of a large-scale parallelized product-sum arithmetic elements. However, the product-sum operation by two-dimensionally parallelized arithmetic elements cannot be realized without difficulty due to wiring problem and the like. Accordingly, a method for decomposing two-dimensional weight distribution data into one-dimensional base group for convolution is desired.

DISCLOSURE OF INVENTION

The present invention has been made in consideration of the above situation, and provides a high-efficiency data coding technique, particularly for encoding distribution data in multidimensional space such as a two-dimensional image by decomposing the data to several one-dimensional bases.

According to the present invention, provided is a method for encoding n data to be encoded, into data representing a base, comprising:

a setting step of setting the base;

a reconstruction step of reconstructing n data by using the bases;

an error calculation step of calculating an error between the n data to be encoded and the reconstructed n data by using a predetermined error evaluation function; and a correction step of correcting the base based on the error.

Other features and advantages of the present invention will be apparent from the following description taken in conjunction with the accompanying drawings, in which like reference characters designate the same name or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 shows 8×8 luminance value data corresponding to input image in a numerical example using particular numerical values;

FIG. 11 shows an initial one-dimensional adaptive base group in the numerical example;

FIG. 12 shows an array of 8×8 numerical values corresponding to a reconstructed image from the initial one-dimensional adaptive base group in the numerical example;

FIG. 13 shows first correction amounts for a one-dimensional adaptive base group with a base number "0" in the numerical example;

FIG. 14 shows the one-dimensional adaptive base group with the base number "0" after the first correction in the numerical example;

FIG. 15 shows the one-dimensional adaptive base group with the base number "0" after the second correction in the numerical example;

FIG. 16 shows the one-dimensional adaptive base group with the base number "0" after the ninth correction in the numerical example;

FIG. 18 shows the one-dimensional adaptive base group with the base number "0" after a convergence of the error E in the numerical example;

FIG. 19 shows the array of 8×8 numerical values corresponding to the reconstructed image from the initial one-dimensional adaptive base group with the base number "0", after the convergence of the error E in the numerical example;

FIG. 20 shows an array of 8×8 numerical values corresponding to a difference coded image after completion of correction of the one-dimensional adaptive base group with the base number "0", after the convergence of the error E, in the numerical example;

FIG. 21 shows the first correction amounts for the one-dimensional adaptive base group with a base number "1" in the numerical example;

FIG. 22 shows the second correction amounts for the one-dimensional adaptive base group with the base number "1" in the numerical example;

FIG. 23 shows four one-dimensional adaptive base groups after completion of correction in the numerical example, and arrays of 8×8 numerical values corresponding to decoded images reconstructed from the base groups;

FIG. 29 shows quantization coefficient vectors according to the third embodiment.

BEST MODE FOR CARRYING OUT THE INVENTION

Preferred embodiments of the present invention will now be described in detail in accordance with the accompanying drawings.

First Embodiment

As a first embodiment, a method for encoding a two-dimensional gray-scale image, defined in a finite range, to two one-dimensional adaptive bases will be described. Note that in the respective embodiments, the adaptive base will also be simply referred to as a "base".

Figure 8:
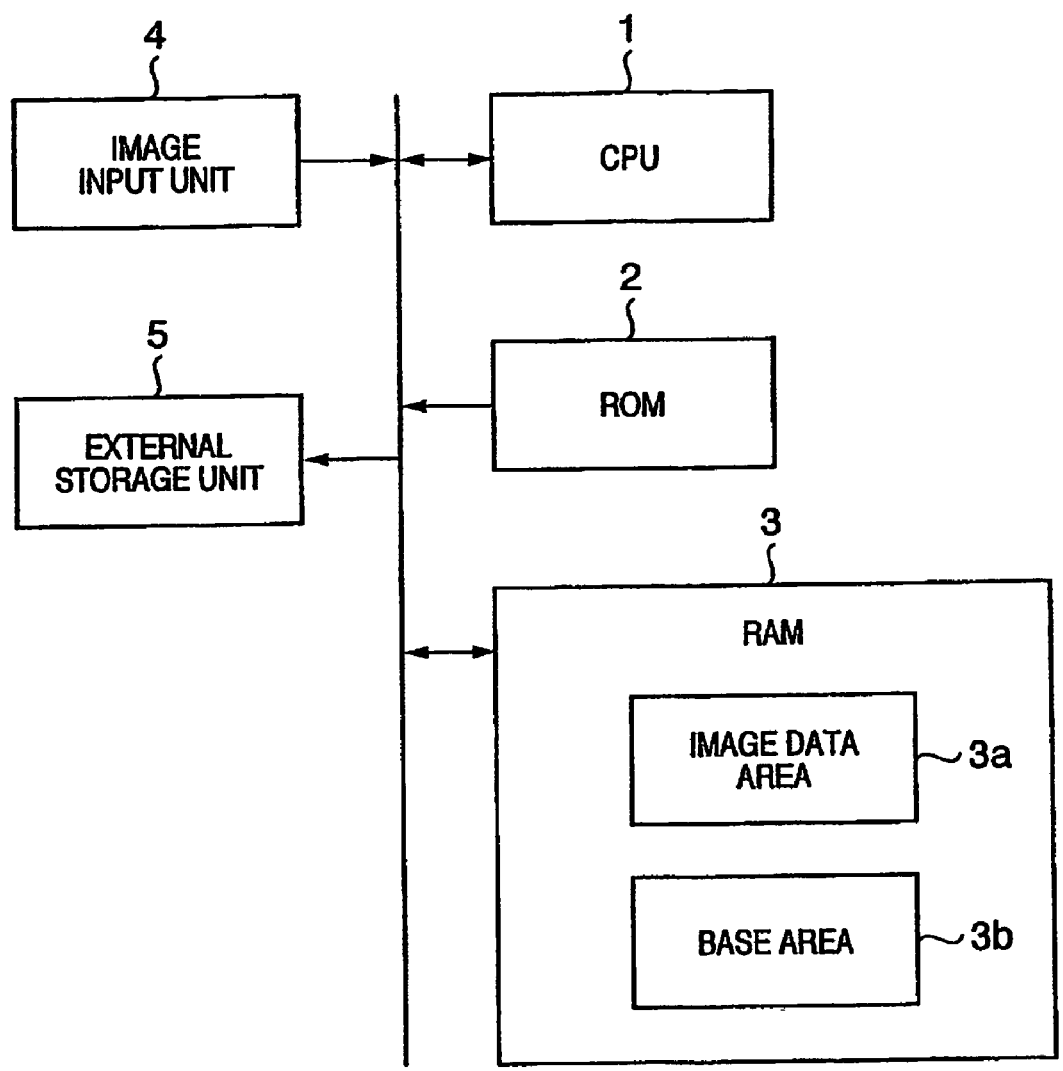
FIG. 8 is a block diagram showing an apparatus construction according to the first embodiment.

FIG. 8 is a block diagram showing an apparatus construction according to the first embodiment.

In FIG. 8, reference numeral 1 denotes a CPU which controls the overall apparatus; 2, a ROM in which a processing procedure (program) for the CPU 1 is stored; and 3, a RAM used as a work area for the CPU 1, in which an image data area 3a for storing image data to be encoded and an area 3b for storing base data are ensured. Note that the sizes of the areas 3a and 3b are determined in correspondence with the size of input image data. Numeral 4 denotes an image input unit which inputs a gray-scale image data to be encoded. As the image input, an image sensing device or the like may be used. In a case where image data is stored in a storage medium, a device to access the storage medium may be used as the image input unit. Otherwise, in a case where an image is received via a network, a network interface may be used as the image input unit. Numeral 5 denotes an external storage unit (hard disk or the like) in which coded data is stored. In a case where coded data is outputted onto a network, a network interface may be used.

In the present embodiment, for the sake of simplification of explanation, image data to be encoded is handled as a 1-pixel-8-bit multivalue (gray-scale) monochrome image. (If the image data represents a color image, coding to be described below is repeated in correspondence with the number of components of the color image.) Further, the image has a rectangular shape where the number of pixels in a horizontal direction is $x_{max}$ and the number of pixels in a vertical direction is $y_{max}$. In a case where the image input unit 4 is an image scanner, the number of pixels $x_{max}$ and $y_{max}$ are uniquely determined respectively based on a reading resolution and an original size.

Input image data is stored into the image data area 3a. At this time, the pixel value of a coordinate (x,y) (Note that $0 \leq x < x_{max}$ and $0 \leq y < y_{max}$ hold) is expressed as f(x,y). For example, in a case where data in k-dimensional space is handled, the data is expressed as $f(x_1, x_2, \ldots, x_k)$. Further, as the size of the input image data is determined, two one-dimensional adaptive bases X(x) and Y(y) are allocated in the base area 3b. Each one-dimensional adaptive base can be regarded as a continuous or discrete one-dimensional sequence of numerical values. Further, if the continuous sequence of numerical values are amplitude values, the sequence of numerical values can be regarded as a waveform. The ranges of "x" and "y" are the same as those of the input image. Note that the pixel value f(x,y) is an 8-bit (1 byte) integer value, and the one-dimensional adaptive bases X(x) and Y(y) are ensured in multi-byte format in the base area 3b of the RAM 3 for storage of decimal place values.

Figure 1:
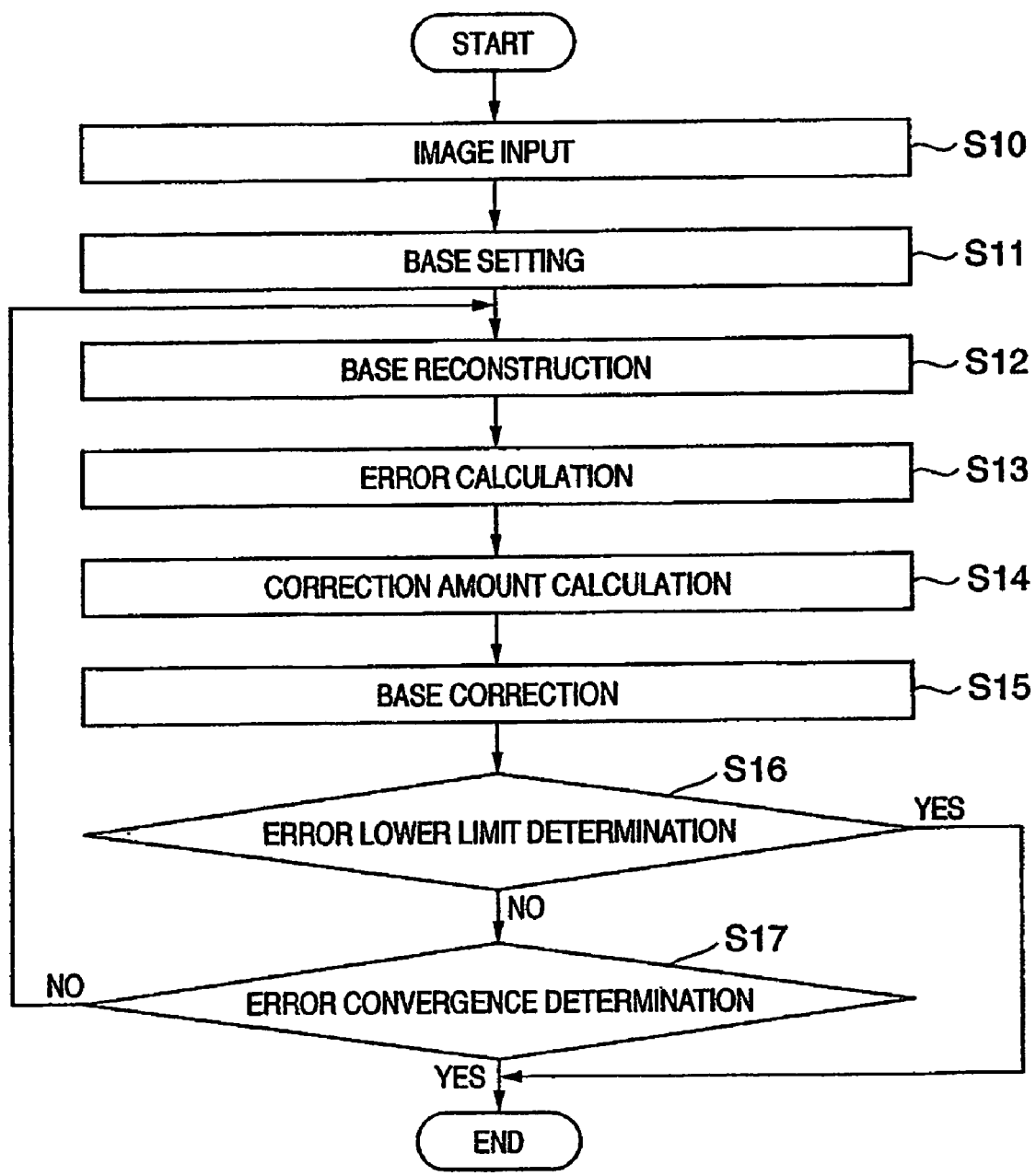
FIG. 1 is a flowchart showing coding processing according to a first embodiment.

Hereinbelow, a coding processing procedure of the CPU 1 according to the first embodiment will be described with reference to the flowchart of FIG. 1 (the corresponding program is stored in the ROM 2).

First, in image data input (step S10), an image f(x,y) as a two-dimensional gray-scale image to be encoded is inputted and stored in the image area 3a. Next, base setting is performed (step S11). At this step, initial values of the two one-dimensional adaptive bases X(x) and Y(y) are set. Note that as the one-dimensional adaptive bases X(x) and Y(y), values which are not "0" in the limited ranges $0 \leq x < x_{max}$ and $0 \leq y < y_{max}$ are set. In this initial stage, the values are set by using random functions. Note that in this embodiment, the respective definition ranges are limited as above, however, the definition ranges are not limited to such limited ranges. That is, even if f(x,y), X(x) and Y(y) are defined in indefinite definition ranges, the present method is applicable (however, there are limitations since the memory capacity is finite) unless an error E and correction amounts ΔX(x) and ΔY(y) to be described later diverge.

In base reconstruction processing (reconstruction processing from a group of adaptive base) (step S12), a reconstructed image $\tilde{f}(x,y)$ is generated (reconstructed image from a group of adaptive bases) as follows.

$$\tilde{f}(x,y) = X(x) \cdot Y(y)$$

Next, in error calculation processing (step S13), an error E between the input image f(x,y) and the reconstructed image $\tilde{f}(x,y)$ is calculated by using the following error evaluation function.

$$E = \int \int \frac{1}{2} \{f(x, y) - \tilde{f}(x, y)\}^2 dx dy$$

Note that $\int f(x)dx$ means an integrated value of f(x) in the entire x definition range. As integration is similarly performed regarding the y component, the error E is an accumulated error in the entire area of the input image. Further, as the error E is used in error convergence determination (step S16 as branch determination) to be described later, it is sequentially stored as a record in the RAM 3.

Next, based on the error E, correction amounts for the respective one-dimensional adaptive bases are calculated (step S14). The correction amounts $\Delta X(x)$ and $\Delta Y(y)$ are calculated as follows.

$$\Delta X(x) = -\eta_x \cdot \frac{\partial E}{\partial X(x)} = \eta_x \cdot \int \{f(x, y) - \tilde{f}(x, y)\} \cdot Y(y) dy$$

$$\Delta Y(y) = -\eta_y \cdot \frac{\partial E}{\partial Y(y)} = \eta_y \cdot \int \{f(x, y) - \tilde{f}(x, y)\} \cdot X(x) dx$$

Note that correction parameters $\eta_x$ and $\eta_y$ are positive constants (setting of the parameters $\eta_x$ and $\eta_y$ will be described later).

The functions to obtain the correction amounts are partial differentiation of the expression to obtain the error E. That is, the error E always has a value greater than "0", and in the ultimate sense, the object of the present embodiment is to obtain one-dimensional adaptive bases with a minimum error E. In a case where the slope in the current one-dimensional adaptive base is minus, a minimum value one-dimensional base is positioned in the positive direction from the current point, while in a case where the slope in the one-dimensional adaptive base is plus, a minimum value one-dimensional base is positioned in the negative direction form the current point. Accordingly, multiplying the slope by minus gives a correction amount corresponding to the slope.

Next, at step S15, correction processing is performed on the respective bases. That is, the correction amounts $\Delta X(x)$ and $\Delta Y(y)$ obtained at step S14 are added to the uncorrected one-dimensional adaptive bases X(x) and Y(y), thereby corrected one-dimensional adaptive bases X'(x) and Y'(y) are obtained. The processing is expressed as follows.

$X'(x) = X(x) + \Delta X(x)$ $Y'(y) = Y(y) + \Delta Y(y)$

Upon correction of one-dimensional adaptive bases, the above-described condition "the respective one-dimensional adaptive bases are always not "0" as long as the input image f(x,y) is always not "0" in the entire defined x and y ranges" must be satisfied. Note that if such condition is satisfied, minute fluctuations can be applied to at least a part of the one-dimensional adaptive bases in a random manner.

The above-described correction on one-dimensional adaptive bases at step S12 (base reconstruction processing) to step S15 (base correction processing) is repeatedly performed until completion determination is made at step S16 at which error lower limit is determined and at step 17 at which error convergence is determined.

In the error lower limit determination at step S16, if the error E of immediately previous correction, calculated in the error calculation (step S13), is equal to or less than a predetermined value, it is determined whether or not the one-dimensional adaptive bases produce an error E within the allowable range. If the above completion determination is made, the one-dimensional adaptive bases at that point are recorded as coded data, and the process ends.

Further, in the error convergence determination at step S17, it is determined whether or not the error has converged based on the recorded error E calculated in the error calculation (step S13). If it is determined that the error has converged, the determination that the one-dimensional adaptive bases at that time produce a minimum error value is outputted, and the process ends. The one-dimensional adaptive bases upon determination of convergence are recorded as coded data of the input image f(x,y). As the determination of error convergence, if a status where the error E has almost no change (the error difference is equal to or less than a predetermined threshold value) in each correction has continued, it is determined that the error has converged.

By the above-described processing, the two-dimensional multivalue (gray-scale) image f(x,y) can be encoded to data expressed by two one-dimensional adaptive bases X(x) and Y(y). In other words, as the image data f(x,y) having pixels $x_{max} \times y_{max}$ is reduced to the coded data expressed by $x_{max} + y_{max}$, it can be assumed that the initial data is compressed (note that since 1 pixel of the input image corresponds to 8 bits, while 1 element of one-dimensional adaptive base corresponds to several bytes, the compression ratio cannot be specified simply by the number of data). Further, a decoded image $f_{decode}(x,y)$ corresponding to the coded two one-dimensional adaptive bases X(x) and Y(y) is obtained based on the following expression.

$f_{decode}(x,y) = X(x) \times Y(y)$

In the above coding processing, the initial one-dimensional adaptive bases X(x) and Y(y) set in the base setting at step S11 are, preferably, values about within the defined x and y ranges of the input image. Preferably, if values which are not "0" but approximately "0" are set, initial value dependency is reduced and appropriate one-dimensional adaptive bases can be obtained with high probability.

Further, preferably, the correction parameters $\eta_x$ and $\eta_y$ are determined in correspondence with the range of the input image f(x,y) and determined x and y ranges. More particularly, it is preferable that the parameter $\eta_x$ is in inverse proportion to the second power of the y range and the range of the input image f(x,y), and the parameter $\eta_y$ is in inverse proportion to the second power of the x range and the range of the input image f(x,y). In this embodiment, the correction parameters $\eta_x$ and $\eta_y$ are changed in accordance with the respective one-dimensional adaptive bases, however, the same value may be used if the defined x and y ranges are approximately the same. If the correction parameter is set to a great value, the completion determination in the error lower limit determination (step S16) or in the error convergence determination (step S17) can be made with high probability by a reduced number of correction of one-dimensional adaptive bases. However, there is a high probability that the error E greatly fluctuates around a minimum value and appropriate one-dimensional adaptive bases cannot be obtained. Further, if the correction parameter is set to a small value, the error E around a minimum value can be obtained and appropriate one-dimensional adaptive bases can be obtained with high probability. However, there is a high probability that a large number of correction of one-dimensional adaptive bases is required until the completion determination is made in the error lower limit determination (step S16) or in the error convergence determination (step S17). In view of the above points, it is preferable that the correction parameter is set to a small value not to cause great fluctuation of the error E around a minimum value and not to require an extremely large number of correction of one-dimensional adaptive bases. Further, a method to gradually reduce the correction parameter in accordance with the number of corrections may be applied.

Further, it is preferable that the previously-determined allowable range of the error E, used in the error lower limit determination (step S16), is determined in correspondence with the range of the input image f(x,y) and the defined x and y ranges. If the error E is set to a great value, the completion determination in the error lower limit determination (step S16) can be made with high probability by a reduced number of correction of one-dimensional adaptive bases. However, there is a high probability that the one-dimensional adaptive bases with high error E value are obtained. On the other hand, if the error E is set to a small value, appropriate one-dimensional adaptive bases with lower error E value are obtained with high probability. However, there is a high probability that a greater number of correction of one-dimensional adaptive bases is required by the completion determination in the error lower limit determination (step S16) or completion determination is not made in the error convergence determination (step S17).

Further, in a case where the correction amounts ΔX(x) and ΔY(y) are calculated in the above-described correction amount calculation (step S14) as follows, by using previous correction amounts $\Delta \hat{X}(x), \Delta \hat{Y}(y)$, there is a high probability that more appropriate one-dimensional adaptive bases with less error value cab be obtained, or desired one-dimensional adaptive bases can be obtained with a reduced number of corrections.

$$\Delta X(x) = \eta_x \cdot \int \{f(x,y) - \mathfrak{f}(x,y)\} \cdot Y(y) dy + \alpha_x \cdot \Delta \hat{X}(x)$$

$$\Delta Y(y) = \eta_y \cdot \int \{f(x,y) - \mathfrak{f}(x,y)\} \cdot X(x) dx + \alpha_y \cdot \Delta \hat{Y}(y)$$

Note that momentum constants $\alpha_x$ and $\alpha_y$ are integer constants less than "1". In the present embodiment, the momentum constants are changed in accordance with the respective one-dimensional adaptive bases, however, the same value may be used. If the momentum constant is set to a great value, the above advantages are obtained with high probability, however, adverse effects also appear and the correction of one-dimensional adaptive bases may become unstable with high probability. Accordingly, the momentum constant set to an extremely large value is not preferable. On the other hand, if the momentum constant is set to a small value, the probability of appearance of adverse effects is lowered, however, the probability to obtain the above advantages is lowered. Accordingly, it is preferable that the momentum constant is set to a value as large as possible within a range where the correction of one-dimensional adaptive bases is stable.

The first embodiment has been described as an example of coding of two-dimensional gray-scale image f(x,y) into two one-dimensional adaptive bases X(x) and Y(y), however, the image to be encoded is not limited to a two-dimensional image. For example, the above coding is applicable to density distribution in three-dimensional space, or applicable to multidimensional space higher than the three-dimensional space. In a case where an object in three-dimensional space is encoded, the object can be encoded to three one-dimensional adaptive bases X(x), Y(y) and Z(z).

Second Embodiment

Figure 5:
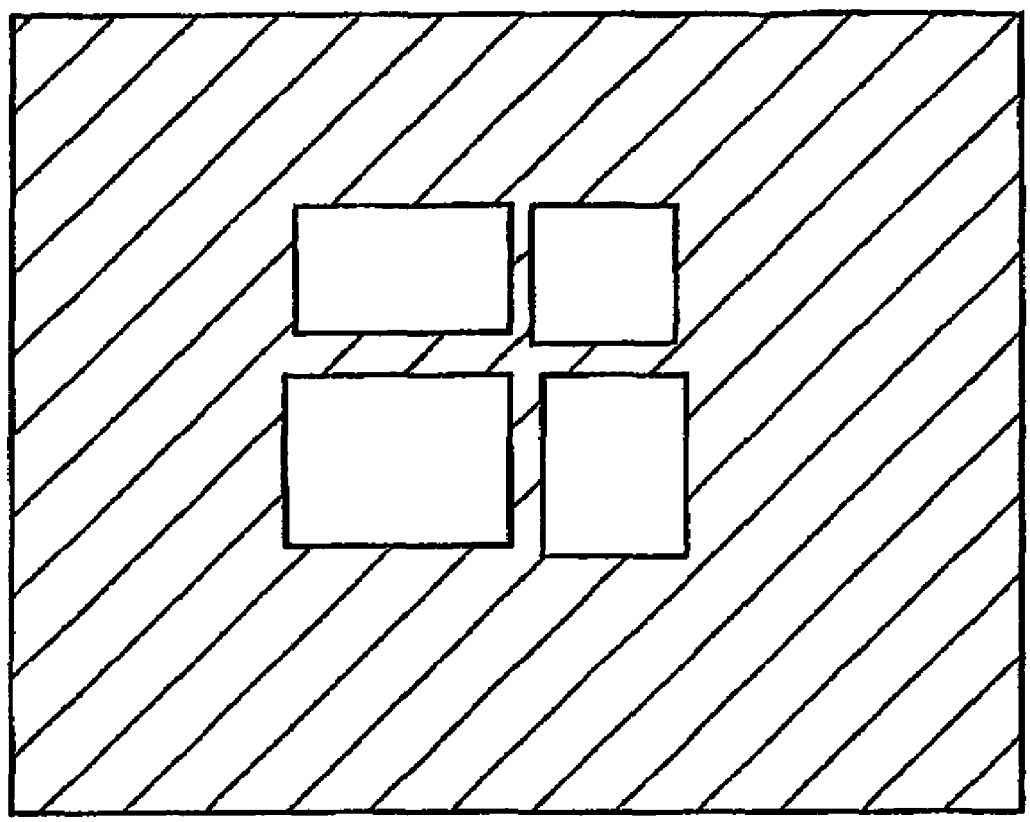
FIG. 5 is a schematic diagram showing an example of two-dimensional image including simple rectangles.

In the above-described first embodiment, as long as a two-dimensional image to be encoded is comparatively simple, error-reduced coding can be realized by appropriately selecting a coordinate system. That is, as long as the two-dimensional image comprises simple rectangular shapes as shown in FIG. 5, coding with comparatively small error can be realized by using an orthogonal coordinate system orthogonal to the rectangles. In this manner, by appropriately selecting a polar coordinate system or the like in correspondence with data, or by selecting a columnar coordinate system or the like for three-dimensional data, coding with reduced error E can be realized.

However, in a case where a two-dimensional image which is a natural image is encoded by the method according to the above-described first embodiment, the error between data (image data) decoded by using coded data and original data becomes large. Accordingly, in the present embodiment, a method for encoding a discrete two-dimensional gray-scale image f(x,y) defined in a finite range into plural group of discrete one-dimensional adaptive base groups $X_1(x), Y_1(y)$ (x and y are integers) will be described as a modification to the first embodiment.

The outline of the second embodiment will be described. One one-dimensional adaptive base group is subjected to similar processing to that of the first embodiment, and subjected to the lower limit determination of error E and convergence determination. Then, if it is not determined that the error E is sufficiently small, a new one-dimensional adaptive base group is added (allocated), and the same processing is repeated so as to reduce the error between the coded data and decoded data.

Figure 2:
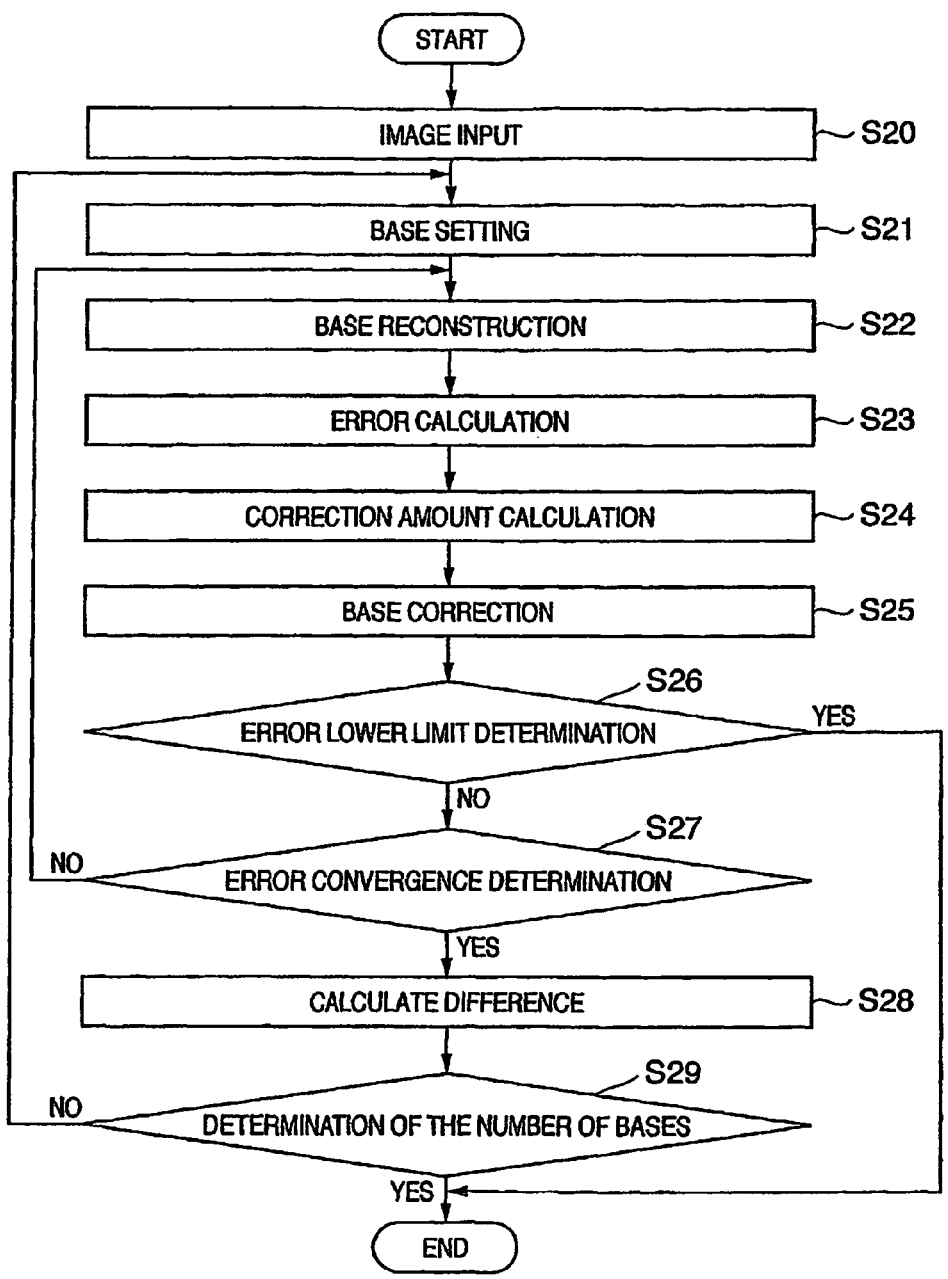
FIG. 2 is a flowchart showing coding processing according to a second embodiment.

In the present embodiment, the apparatus construction is the same as that of the first embodiment. Hereinbelow, the processing according to the second embodiment will be described with reference to the flowchart of FIG. 2.

First, in image input (step S20), an input image f(x,y) as a discrete two-dimensional gray-scale image to be encoded is inputted. As in the case of the first embodiment, x and y have predetermined definition areas, $0 \leq x < x_{max}$ and $0 \leq y < y_{max}$. Further, in the second embodiment, the input image is discrete, and x and y are integers.

Figure 11:
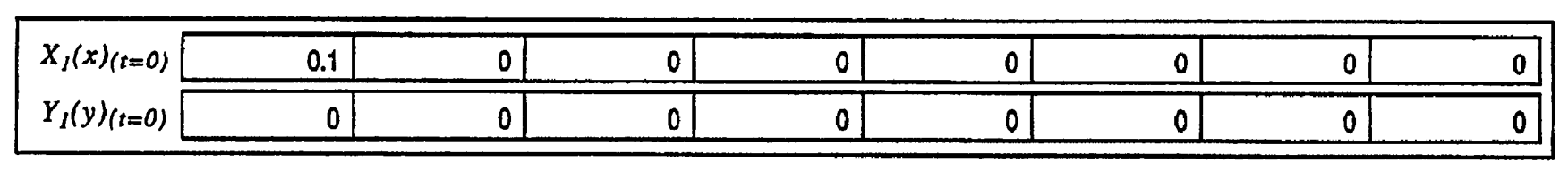

As a particular example, processing performed on 8×8 luminance value data as shown in FIG. 10 will be described. Hereinbelow, the example using particular numerical values will be referred to as a numerical example. The numerical values in FIG. 10 are non-negative integers in 8-bit precision, however, any data may be employed as long as difference between the values can be defined. Following the image input (step S20), the base setting processing is performed (step S21). One of discrete one-dimensional adaptive base group $X_1(x), Y_1(y)$ (x and y are integers) is selected and set as an initial one-dimensional adaptive base group. The suffix "1" is a base number. In the present embodiment, although the base number is not particularly limited, the base number is sequentially selected from "0" to a predetermined number. As the image subjected to processing in the numerical example is an 8×8-luminance value data, each of the one-dimensional adaptive bases is a sequence of numerical values having 8 elements. As described in the first embodiment, it is preferable that approximately "0" random numbers are set as initial numerical values. However, in the initial one-dimensional adaptive base group having suffix "1", a one-dimensional adaptive base group as shown in FIG. 11 is used merely to satisfy the condition that all the elements are not "0", for the sake of simplification. In FIG. 11, the value of bracketed "t" indicates the number of corrections on one-dimensional adaptive base. That is, if t=n holds, the one-dimensional adaptive base has been corrected n times.

Next, the base reconstruction processing is performed (step S22). A reconstructed image $\mathfrak{f}_1(x,y)$ is calculated as follows.

$$\mathfrak{f}_1(x,y) = X_1(x) \cdot Y_1(y)$$

Figure 12:
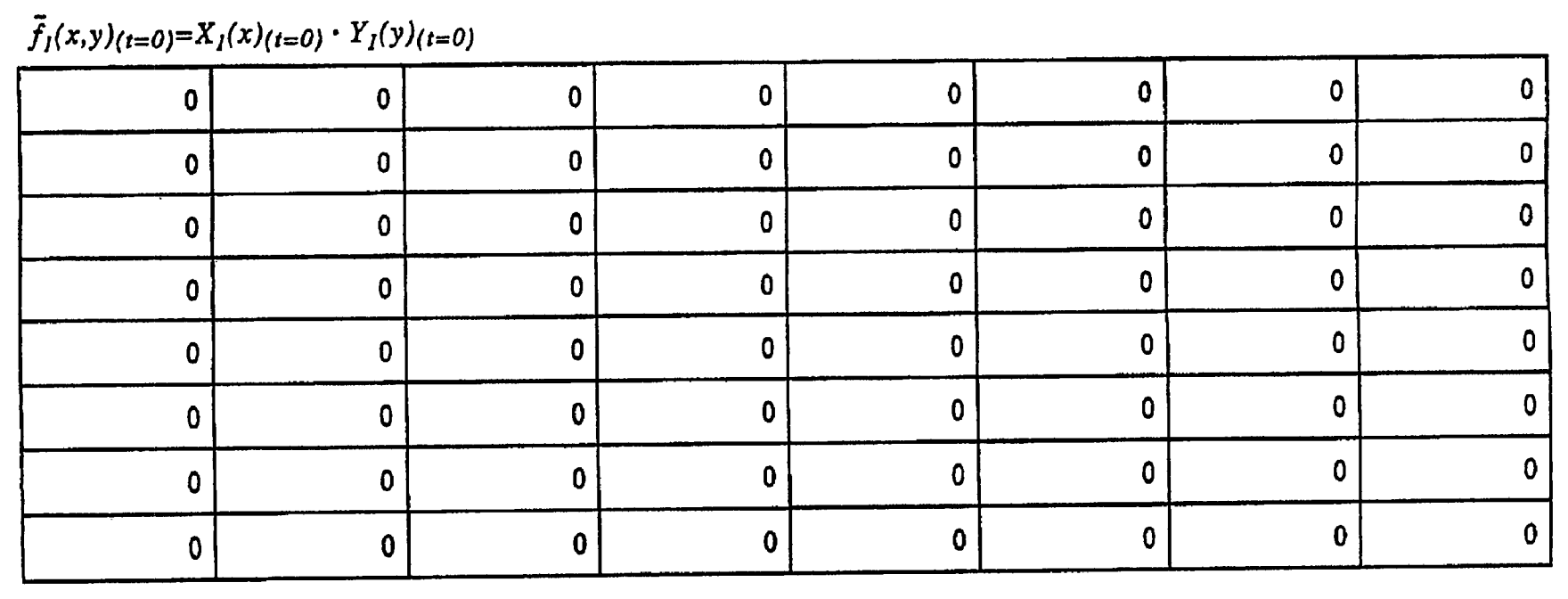

FIG. 12 shows an array of 8×8 numerical values corresponding to a reconstructed image $\mathfrak{f}_0(x,y)$ immediately after the base setting processing (step S21) using the initial one-dimensional adaptive base group. Next, the error E is calculated as follows by error calculation (step S23).

$$E = \sum_x \sum_y \left[ \frac{1}{2} \{ f_l(x, y) - \tilde{f}_l(x, y) \}^2 \right] \quad (1)$$

In the above expression, $f_l(x)$ is a difference coded image expressed as follows.

$$f_l(x, y) = f(x, y) - \sum_{n=0}^{l-1} \tilde{f}_n(x, y)$$

Note that $$\sum_x f(x)$$

means summation of f(x) when x is an integer, in the entire x definition range.

Further, $$\sum_{k=n}^{m} f_k(x)$$

means liner summation of $f_k(x)$ when $n \leq k \leq m$ holds. If $m<n$ holds, the result of summation is 0. In the numerical example, as the difference coded image $f_0(x)$ becomes an input image, the error E is "482913".

The above difference coded image $f_l(x,y)$ means the result of subtraction of the respective reconstructed images, reconstructed from one one-dimensional adaptive base group, having the base number "0" to "l-1", from the input image f(x,y). That is, in the second embodiment, as the respective one-dimensional adaptive base groups are corrected while a one-dimensional adaptive base group is sequentially selected from the base number "0", the difference coded image $f_l(x,y)$ corresponds to the result of subtraction of the respective reconstructed images, reconstructed from the correction-completed one-dimensional adaptive base groups, from the input image f(x,y).

Next, in the correction amount calculation (step S24), correction amounts $\Delta X_1(x)$ and $\Delta Y_1(y)$ for the one-dimensional adaptive base group $X_1(x), Y_1(y)$, selected in the base setting (step S21), are calculated as follows.

$$\Delta X_l(x) = -\eta_x \cdot \frac{\partial E}{\partial X_l(x)} = \eta_x \cdot \sum_y \left[ \{ f_l(x, y) - \tilde{f}_l(x, y) \} \cdot Y_l(y) \right]$$

$$\Delta Y_l(y) = -\eta_y \cdot \frac{\partial E}{\partial Y_l(y)} = \eta_y \cdot \sum_x \left[ \{ f_l(x, y) - \tilde{f}_l(x, y) \} \cdot X_l(x) \right]$$

Otherwise, the correction amounts may be calculated by using the following expressions where the previous correction amounts $\Delta \hat{X}(x), \Delta \hat{Y}(y)$ are multiplied by the momentum constants $\alpha_x, \alpha_y$ described in the first embodiment are added.

$$\Delta X_l(x) = -\eta_x \cdot \frac{\partial E}{\partial X_l(x)} + \alpha_x \cdot \Delta \hat{X}(x) \quad (2)$$

$$= \eta_x \cdot \sum_y \left[ \{ f_l(x, y) - \tilde{f}_l(x, y) \} \cdot Y_l(y) \right] + \alpha_x \cdot \Delta \hat{X}(x)$$

$$\Delta Y_l(y) = -\eta_y \cdot \frac{\partial E}{\partial Y_l(y)} + \alpha_y \cdot \Delta \hat{Y}(y)$$

$$= \eta_y \cdot \sum_x \left[ \{ f_l(x, y) - \tilde{f}_l(x, y) \} \cdot X_l(x) \right] + \alpha_y \cdot \Delta \hat{Y}(x)$$

In the above expressions, $\eta_x$ and $\eta_y$ are correction parameters similar to those described in the first embodiment.

In the numerical example, the correction amounts are calculated by using the expression (2). In the case of correction amounts for the one-dimensional adaptive base group shown in FIG. 11, i.e., immediately after the base setting processing (step S21), the values of the momentum constants are "0" since all the elements of the previous correction amounts $\Delta \hat{X}(x), \Delta \hat{Y}(y)$ are "0". FIG. 13 shows the correction amounts in this case. In the figure, the value of bracketed "t" indicates the number of corrections. That is, if t=n holds, the correction amounts corresponds to the n-th one-dimensional adaptive base correction. As the correction parameters in this case, $\eta_x = \eta_y = 0.00078$ holds, and as the momentum constants, $\alpha_x = \alpha_y = 0.4$ holds.

In the base correction (step S25), assuming that corrected one-dimensional adaptive base group is $X'_1(x), Y'_1(y)$, and uncorrected one-dimensional adaptive base group is $X_1(x), Y_1(y)$, the respective one-dimensional adaptive base groups are corrected by using the correction amounts $\Delta X_1(x)$ and $\Delta Y_1(y)$ calculated as above as follows.

$$X_1'(x) = X_1(x) + \Delta X_1(x)$$

$$Y_1'(y) = Y_1(y) + \Delta Y_1(y)$$

Figure 17:
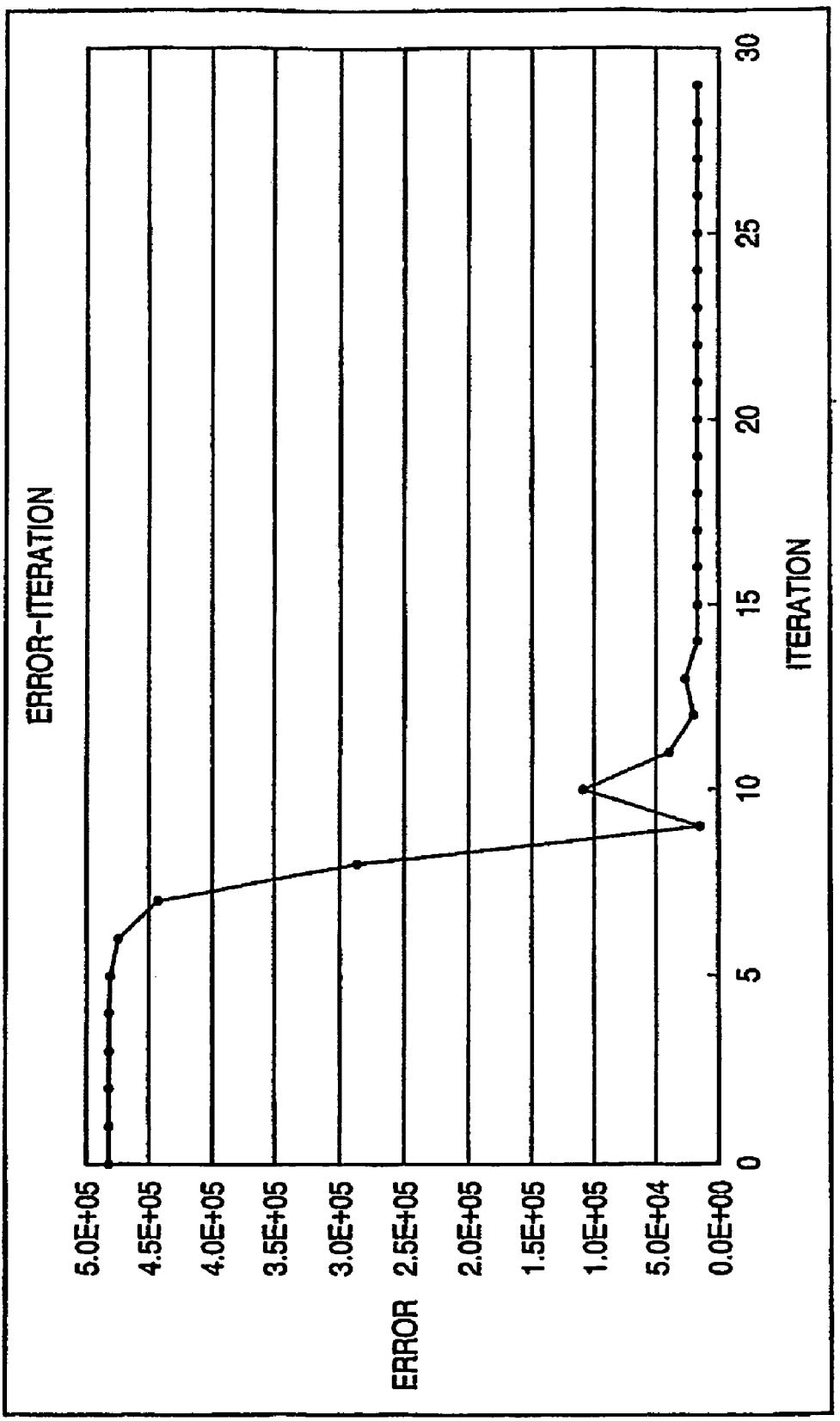
FIG. 17 is a line graph showing changes of error E to the corrections on the one-dimensional adaptive base group with the base number "0" in the numerical example.

The result of this correction on the one-dimensional adaptive base group shown in FIG. 11 is as shown in FIG. 14. In the first correction, since all the elements of the initial one-dimensional adaptive base group are "0" except one element, only a part of the elements has been corrected. Further, as the numerical value other than "0" is comparatively small, "0.1", the first correction amounts are very small. Preferably, random numbers are set as the numerical values, and all the elements are corrected in the first correction. However, since it is desirable that initial values are approximately "0", the correction amounts are small. Then the error E is calculated based on the expression (1) by using the corrected one-dimensional adaptive base group, and the value "482911.48" is obtained. The error E is slightly reduced in the first correction. As in the case of the first embodiment, such correction is repeatedly performed until the completion determination is made in the error lower limit determination (step S26) or the convergence determination is made in the error convergence determination (step S27), thereby the one-dimensional adaptive base group having the base number selected in the base setting (step S21) is corrected. For example, after the correction with the first correction amounts as shown in FIG. 13, the second correction amounts are as shown in FIG. 15, and the error E is "482906.05". In the second correction, although the correction amounts are very small, all the elements are corrected. In this numerical example, the seventh to tenth correction amounts are comparatively large. For example, the ninth correction amounts are as shown in FIG. 16. The error E immediately before the ninth correction is "286696.02", and the error immediately after the ninth correction is greatly reduced to "16349.27". FIG. 17 shows the relation between the corrections and the changes of the error E. As shown in FIG. 17, the error E is reduced by each correction in an accelerative manner, from the first to ninth corrections. Then the error is temporarily increased, then, the error, with fluctuations, is gradually converged. The sudden increase after the ninth correction is caused by the influence of momentum constants. If the momentum constants are set to "0", such increase does not easily occur, however, above processing is effective for reduction of the number of corrections by the convergence and for avoidance of a trap to a local minimum value.

The error lower limit determination at step S26 and the error convergence determination at step S27 are the same as those described in the first embodiment. In the error lower limit determination at step S26, if completion determination has been made, the number of base groups selected and corrected by that time and those one-dimensional adaptive base groups are recorded as coded data, and the process ends. In the above numerical example, the error is still large at this stage and sufficient approximation is not made. For example, if the error lower limit is "100", the completion determination is not made. If the completion determination has not been made, the process proceeds to the next error convergence determination at step S27, at which it is determined whether or not the error E has converged. In the numerical example, when correction has been performed about 30 times, the error E has approximately converged, to about "16199". FIG. 18 shows the one-dimensional adaptive base group when the error E has converged. Further, FIG. 19 shows the array of 8×8 numerical values corresponding to the reconstructed image $f_0(x,y)$ from the one-dimensional adaptive base group. In the figure, the number of corrections of one-dimensional adaptive base "t→∞" means that correction has been repeated such that the error E has converged.

In the first embodiment, if it is determined that the error E has converged in the error convergence determination at step. S27, completion determination is made and the process ends. However, in the second embodiment, the process proceeds to difference calculation processing at step S28. If it is not determined that the error E has converged, the process returns to the base reconstruction at step S22, in which correction is repeatedly performed on the one-dimensional adaptive base group with the selected base number.

If it is determined that the error E has converged, then in the difference calculation at step S28, a reconstructed image $f_1(x,y)$ reconstructed from the one-dimensional adaptive base group with the base number "1" is calculated by $$f_{l+1}(x, y) = X_1(x) \cdot Y_1(y)$$

and a difference coded image $f_{l+1}(x,y)$ is generated by $$f_{l+1}(x, y) = f(x, y) - \sum_{n=0}^{l} \tilde{f}_n(x, y) \quad (3)$$

In the above-described numerical example, as l=0 holds, the difference coded image $f_1(x,y)$ is the result of simple subtraction of the reconstruction image $f_0(x,y)$, reconstructed from the one-dimensional adaptive base group with the base number "0", from the input image f(x,y). FIG. 20 shows an array of 8×8 numerical values corresponding to the difference coded image $f_1(x,y)$.

Next, in the base number determination at step S28, if it is determined that the number of correction completed base groups has become a predetermined number, completion determination is made. Then the number of selected and corrected base groups by that time and those one-dimensional adaptive base groups are recorded as coded data, and the process ends. If it is determined that the number of correction completed base groups has not become the predetermined number, the process returns to the base setting at step S21, in which a new one-dimensional adaptive base group is selected, and the processing from the base reconstruction at step S22 to the error convergence determination at step S27 is repeatedly performed, thus correction on the newly-selected one-dimensional adaptive base group is performed.

In the above-described numerical example, since correction has been completed regarding only one group, if an allowable number of base groups is set to, e.g., "4", as the number of correction completed groups has not become the predetermined number, the process returns to the base setting (step S21). Then the next one-dimensional adaptive base group having the base number "1" is selected, and correction is performed on the one-dimensional adaptive base group in accordance with the expression (2) by using the difference coded image $f_1(x,y)$ obtained in the difference calculation (step S28).

As described above, as the initial one-dimensional adaptive base group is as shown in FIG. 11, the one-dimensional adaptive base group with the base number "1" selected here is the same as that shown in FIG. 11. At this time, the first correction amounts are as shown in FIG. 21, and only a part of the elements is corrected as in the case of the first correction on the one-dimensional adaptive base group with the base number "0". The immediately previous error E of the first correction is "16199.19", and the error E becomes "16199.14" by the correction, thus the error is slightly reduced. The second correction amounts are as shown in FIG. 22. The error E after the correction is "16199.07". Such correction is repeated by the error convergence, thereby the error E is reduced to about "4749".

When the error has converged, the next difference coded image $f_2(x,y)$ is obtained based on the expression (3). The difference coded image $f_2(x,y)$ is the result of subtraction of the reconstruction image $f_0(x,y)$ reconstructed from the one-dimensional adaptive base group with the base number "0" and the reconstruction image $f_1(x,y)$ reconstructed from the one-dimensional adaptive base group with the base number "1", from the input image f(x,y).

In this manner, the difference coded image is the data component obtained by subtracting the reconstruction images reconstructed from all the correction-completed one-dimensional adaptive base groups from the input image. With respect to the difference coded image $f_2(x,y)$, the initial one-dimensional adaptive base group with the base number "2" is selected, and correction is performed on the one-dimensional adaptive base group based on the expression (2). In this manner, the number of one-dimensional adaptive base groups is increased.

In the numerical example, when the correction of the first one-dimensional adaptive base group has been completed, the error E is about "16199", and when the correction on the second base group has been completed, the error E is about "4749". Then, when the correction on the third base group has been completed, the error E is about "3312", and when the correction on the fourth base group has been completed, the error E is about "671". In this numerical example, as the allowable number of the base groups is "4", the process ends at this stage by the determination of the number of base groups (step S28) regardless of the error E value. In a case were the error lower limit in the error lower limit determination (step S26) is set to "1000", as the error becomes less than the set lower limit in the middle of the fourth correction, the process ends at that time.

However, the above arrangement, where the correction is terminated in the middle without increasing the number of base groups even though the error can be further reduced, is significant in the point of high-speed processing, but not advantageous in the point of approximation performance. Accordingly, the completion determination in the error lower limit determination (step S26) may be arranged such that, in correction on one-dimensional adaptive base group where the error becomes less than the lower limit, completion determination is made when the error has converged.

The predetermined number of base groups used in the number of base groups determination processing (step S28) may be set to an infinite number, however, if the error allowable range used in the error lower limit determination (step S26) is small, there is a high probability that a very large number of base groups are required. Accordingly, the number of base groups is previously limited, thereby the above coding can be performed with data amount with upper limit.

The coded data, encoded by the above method, is decoded to a decoded image $f_{decode}(x,y)$ as follows.

$$f_{decode}(x, y) = \sum_{n=0}^{k-1} [X_n(x) \cdot Y_n(y)]$$

In the above expression, "k" means the number of selected and corrected base groups.

In this manner, in the coding method according to the second embodiment, decoded data can be obtained from coded data encoded by simple processing.

FIG. 23 shows four one-dimensional adaptive base groups obtained in the numerical example, and arrays of 8×8 numerical values corresponding to decoded images reconstructed from the base groups.

In the numerical example, the image to be encoded is an 8×8 luminance value image for the sake of simplification, however, such small data size has almost no meaning in the point of data compression. It is preferable that coding is performed on larger sized data as an example of image data coding for this purpose.

Figure 24:
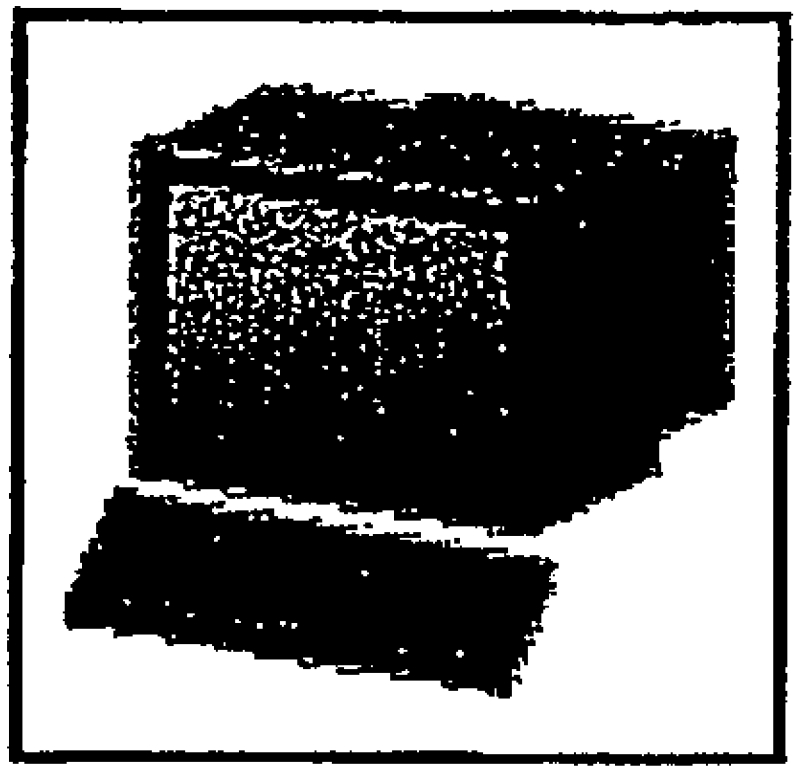
FIG. 24 shows an example of an input image according to the second embodiment.
Figure 25:
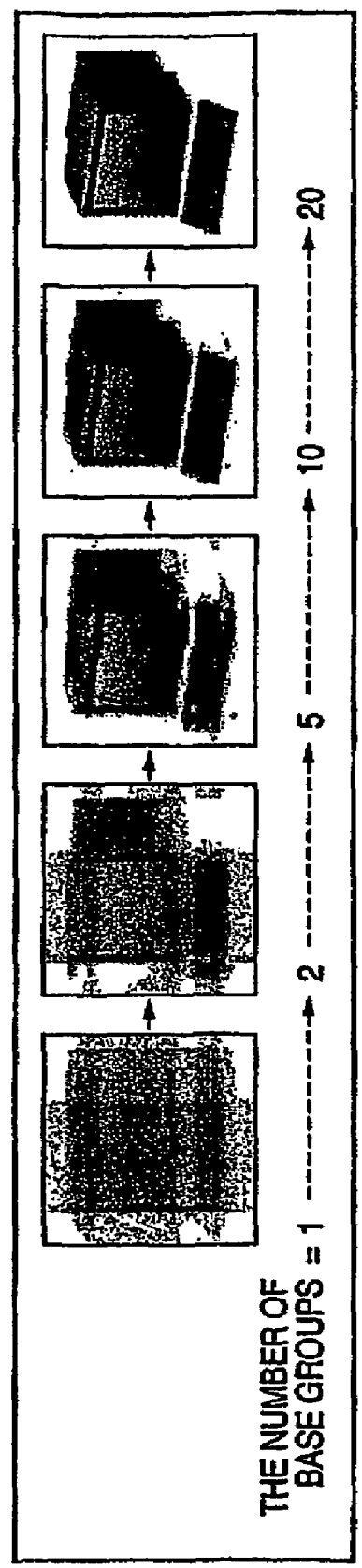
FIG. 25 shows an example of decoded images according to the second embodiment.

For example, FIG. 25 shows reconstructed images obtained by performing the above coding on a 100×100 pixel image as shown in FIG. 24 and reconstructing from the coded image.

In FIG. 25, the reconstructed images are obtained from processings using one base group, two base groups, five base groups, ten base groups, and twenty base groups. As it is understood from this example, sufficient approximation to the original input image can be attained in the case of about twenty base groups. If one pixel value of the 100×100 pixel image as data to be encoded is a 4-byte floating point, the data amount is 4 bytes×100×100=40000 bytes. If each element value of one-dimensional adaptive base is also a 4-byte floating point, the data amount of twenty base groups is 4 bytes× (100[the number of elements of X-directional one-dimensional adaptive bases]+100[the number of elements of Y-directional one-dimensional adaptive bases])×20(the number of base groups)=16000 bytes. Thus, the data compression has been achieved.

Actually, in the case of general image as shown in FIG. 24, as one pixel value is represented by 1 byte, the data amount is 1 bytes×100×100=10000 bytes. In this case, If each element value of one-dimensional adaptive base is also a 4-byte floating point, the data amount is increased. However, in the case of general image, as the precision of 4 bytes is not necessary for the value of each element of one-dimensional adaptive base, precision of 8 bits or 6 bits is sufficient. Accordingly, it may be arranged such that only upper and lower limits of the respective one-dimensional adaptive bases are held with the 4-byte floating point precision, and the values of elements of the one-dimensional adaptive base are rounded to a desired number of bits by using the upper and lower limits.

Figure 26:
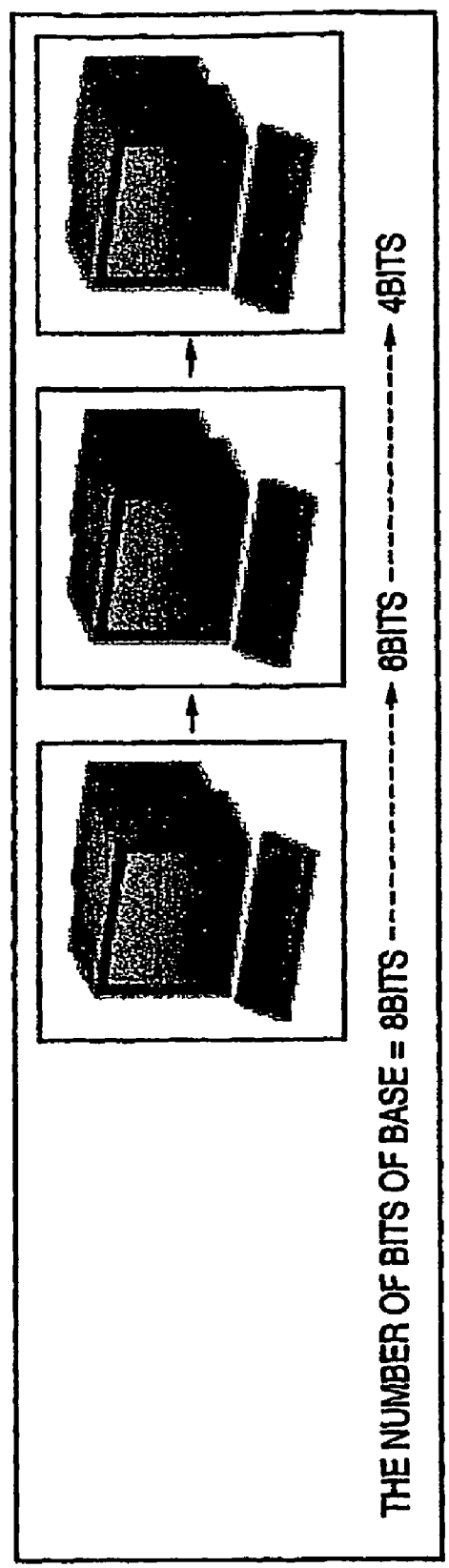
FIG. 26 shows an example of decoded images in a case where the precision is rounded according to the second embodiment.

FIG. 26 shows decoded images reconstructed from coded images in a case where the number of base groups is twenty and the bit numbers of adaptive bases are respectively rounded to 8-bits, 6-bits and 4-bits. The data amount of the rounded 8-bit image is {1 byte[8 bits]×(100[the number of X-directional one-dimensional adaptive base elements]+100 [the number of Y-directional one-dimensional adaptive base elements]+4 bytes×4[upper limit necessary for 1 base group/ number of held lower limit data]}×20[the number of base groups]=4320 bytes. Thus, the data amount is compressed. In the case of 6-bit image, the data amount is 3320 bytes, and in the case of 4-bit image, the data amount is 2320 bytes.

The rounding of the values of one-dimensional adaptive base elements is not limited to the above-described method, but any other method such as rounding using a predetermined absolute value may be employed. Further, the rounding of the values of one-dimensional adaptive base elements may be performed after the completion of coding using plural one-dimensional adaptive base groups, however, there is a probability that the error is accumulated. Accordingly, it is preferable that the rounding is performed upon completion of correction on one one-dimensional adaptive base group then a difference coded image to be used for correction on the next one-dimensional adaptive base group is obtained by using the rounded one-dimensional base group.

Figure 27:
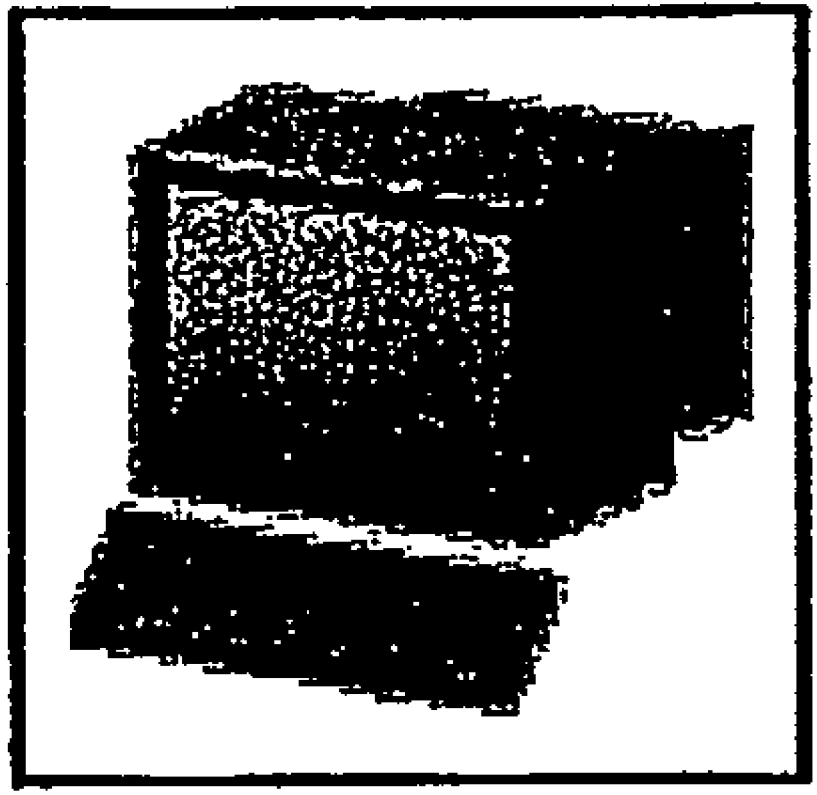
FIG. 27 shows an example of a decoded image obtained by dividing an input image and performing coding and decoding, according to the second embodiment.

Further, in a case where the above-described coding method is applied to a larger sized image of, e.g., 1280×960 pixels, as the number of one-dimensional adaptive base elements is large, the error convergence cannot be easily attained. In such case, it may be arranged such that the image is divided into blocks having a predetermined size of, e.g., 50×50 pixels, and the above-described coding is performed on the respective blocks. FIG. 27 shows a decoded image obtained by performing the 50×50 pixel size block division and coding on the image in FIG. 24 and decoding on the coded image. In this case, in an upper-left 50×50 pixel block, the number of base groups is 8, and in upper-right, lower-left and lower-right blocks, the numbers of base groups are 10, 7 and 12. The one-dimensional adaptive base elements are respectively rounded to 8 bits. The size of coded data is 4292 bytes including upper-limit and lower-limit retention data. In comparison with the case of encoding a 100×100 sized image with 8-bit rounding without division, the data amount is somewhat smaller. In this manner, as an input image is divided into appropriate sized blocks and coding is performed on the respective blocks, coding with a small number of base groups can be realized in a simple structured block, the data amount can be reduced. Note that if the block size is too small, the advantage of data compression by each block is reduced as in the case of the above-described 8×8 image, and further, the upper and lower limit data are increased. Accordingly, it is preferable to set an appropriate block size.

The block size may be adaptively determined for an image to be encoded, but the block size may be previously set to a predetermined size. In the case where the block size is a predetermined size, remainder(s) may occur upon division. For example, in a case where an input image having a size of 1280×960 pixels is divided by 50×50 pixels from an upper left corner, horizontal 30 pixels remain in a right end portion and 10 pixels remain in a lower end portion. In this case, coding may be performed on the right end portion on the assumption that it is divided by 30×50 pixels, on the lower end portion on the assumption that it is divided by 50×10 pixels, and on a lower right portion on the assumption that it is divided by 30×10 pixels. Further, in the case of coding on all the image divided by 50×50 pixels, coding may be performed on the assumption that 40 pixels in the lower end portion, 20 pixels from the left and 40 pixels from the bottom in the lower right portion are "0".

As described above, in the second embodiment, a discrete two-dimensional gray-scale image f(x,y) defined in a finite range is encoded to plural discrete one-dimensional adaptive base groups $X_1(x), Y_1(y)$. As a result, in comparison with the first embodiment, even in a case where an image to be encoded is a natural image, coding with high precision can be performed.

Third Embodiment

In a third embodiment as a modification to the above-described second embodiment, a discrete two-dimensional gray-scale image f(x,y) defined in a finite range is divided into blocks and converted to plural discrete one-dimensional adaptive base groups $X^{\xi,\zeta}_1(x), Y^{\xi,\zeta}_1(y)$ by each block, and coding is performed on each block. In this embodiment, as the apparatus construction is the same as that of the first embodiment, the explanation thereof will be omitted.

Figure 3:
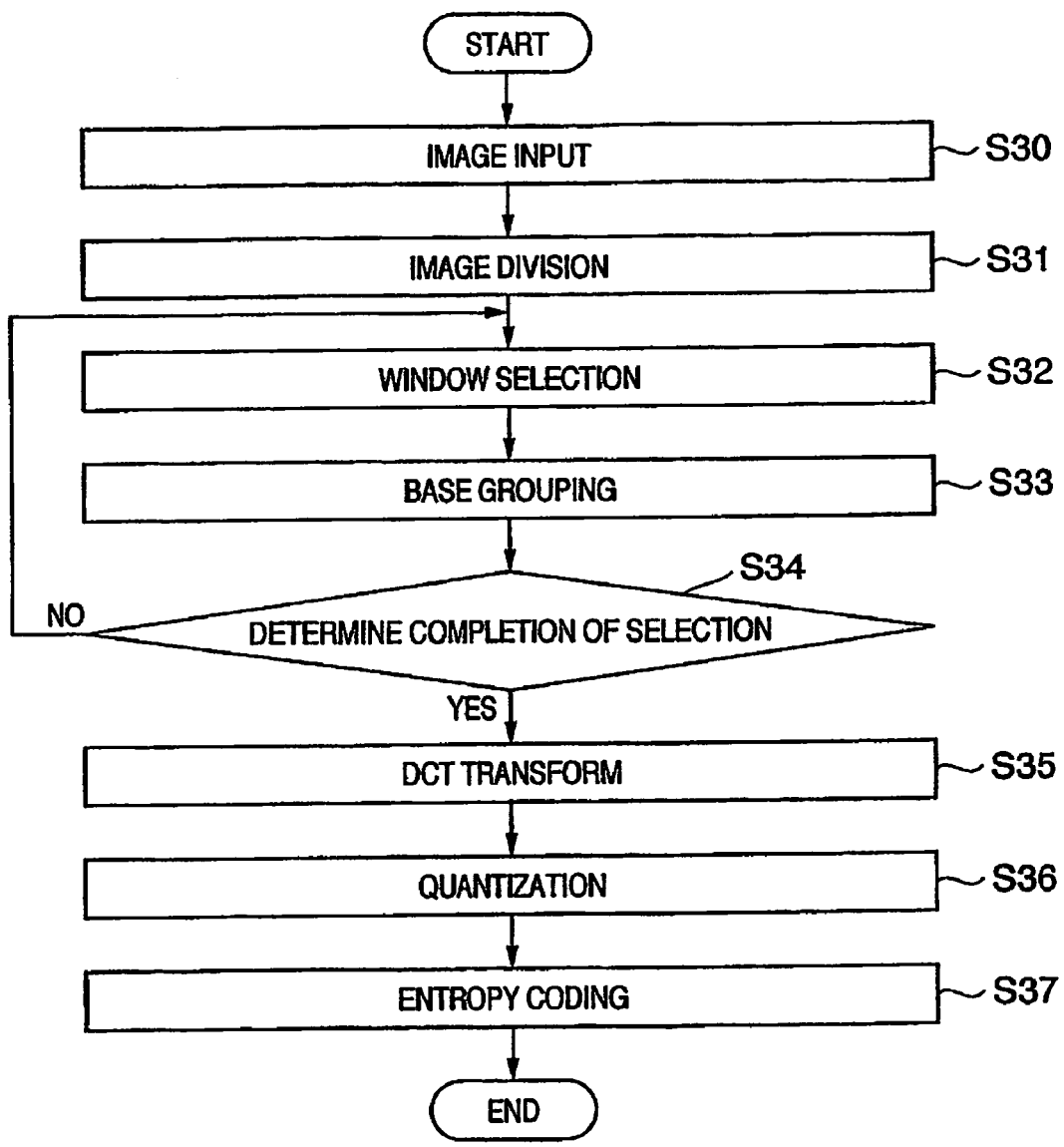
FIG. 3 is a flowchart showing coding processing according to a third embodiment.

FIG. 3 is a flowchart showing the processing according to the third embodiment. Hereinbelow, a processing procedure according to the third embodiment will be described with reference to FIG. 3.

First, in the image input (step S30), an input image f(x,y) which is a discrete two-dimensional gray-scale image to be encoded is inputted. As in the case of the first and second embodiments, the definition areas of x and y are integers having ranges $0 \leq x \leq x_{max}$ and $0 \leq y \leq y_{max}$.

Next, in image division processing (step S31), the input image is divided into plural windows $W^{\xi,\zeta}(x,y)$ having a size of $L_x, L_y$ ($L_x$ and $L_y$ are non-negative integers), expressed as follows.

$$W^{\xi,\zeta}(x,y)=f(x+\xi L_x, y+\zeta L_y)$$

Note that ξ and ζ are integers equal to or greater than "0". The definition ranges of each window is $0 \leq x < L_x$, $0 \leq y < L_y$. Further, in a window where $x+\xi L_x \geq x_{max}$ or $y+\zeta L_y \geq y_{max}$ holds, it may be arranged such that the range of $x+\xi L_x \geq x_{max}$ or $y+\zeta L_y \geq y_{max}$ is rounded down as a window having a size smaller than $L_x, L_y$.

Next, window selection processing is performed (step S32). One window $W^{\xi,\zeta}(x,y)$ is selected from the windows obtained by dividing the input image by the image division processing at step S31. The order of selection is not particularly limited as long as one un-selected window is selected.

Next, base grouping processing (step S33) is performed on the window $W^{\xi,\zeta}(x,y)$ selected in the window selection processing at step S32. The selected window $W^{\xi,\zeta}(x,y)$ is converted into plural discrete one-dimensional adaptive base groups $X^{\xi,\zeta}_1(x), Y^{\xi,\zeta}_1(y)$. The base grouping processing may be performed by using a similar method to that of coding to plural one-dimensional adaptive base groups as described in the second embodiment. The definition ranges of one-dimensional adaptive base groups $X^{\xi,\zeta}_1(x), Y^{\xi,\zeta}_1(y)$ are basically $0 \leq x < L_x$ and $0 \leq y < L_y$. Further, in the above-described window where $x+\xi_x \geq x_{max}$ or $y+\zeta L_y \geq y_{max}$ holds, it may be arranged such that, assuming that the window size is $L_x, L_y$, $0 \leq x < L_x$ and $0 \leq y < L_y$) hold. The image division processing at step S31 is, more particularly, similar to the division by a predetermined block size described in the second embodiment.

Since the base grouping processing at step S33 is similar to that of the second embodiment, the detailed explanation thereof will be omitted. When the conversion of the one window $W^{\xi,\zeta}(x,y)$, selected in the window selection at step S32 to one-dimensional adaptive base groups by the base grouping processing at step S33, has been completed, the process proceeds to selection completion determination processing at step S34.

In the selection completion determination processing at step S34, it is determined whether or not all the windows have been selected. If there is an unselected window, the process returns to the window selection at step S32, in which the unselected window is selected, then the conversion of the window to plural one-dimensional adaptive base groups is performed by the above-described base grouping at step S33. If it is determined all the windows have been selected, the process proceeds to DCT transform processing at step S35.

In the DCT transform processing at step S35, each of the plural discrete one-dimensional adaptive base groups $X^{\xi,\zeta}_1(x), Y^{\xi,\zeta}_1(y)$ of each window $W^{\xi,\zeta}(x,y)$, generated in the base grouping processing at step S33, is discrete-cosine transformed to DCT vectors $U^{\xi,\zeta}_1(x), V^{\xi,\zeta}_1(y)$ The discrete cosine transform on the respective one-dimensional adaptive bases is performed by using the following transform expression.

$$U^{\xi,\zeta_l}(x) = \sum_{i=0}^{L_x-1}\left[\sqrt{\frac{2}{L_x}} \cdot c_x \cdot \cos\left\{\frac{x \cdot (2i+1)}{2L_x} \cdot \pi\right\} \cdot X^{\xi,\zeta_l}(i)\right]$$

$$V^{\xi,\zeta_l}(y) = \sum_{i=0}^{L_y-1}\left[\sqrt{\frac{2}{L_y}} \cdot c_y \cdot \cos\left\{\frac{y \cdot (2i+1)}{2L_y} \cdot \pi\right\} \cdot Y^{\xi,\zeta_l}(i)\right]$$

When x=0 holds, $C_x=1/\sqrt{2}$. Further, when x≠0 holds, $c_x=1$ holds. Similarly, when y=0 holds, $C_y=1/\sqrt{2}$ holds, and when y≠0 holds, $c_y=1$ holds.

In the above transform, all the discrete one-dimensional adaptive base groups $X^{\xi,\zeta}_1(x), Y^{\xi,\zeta}_1(y)$ generated in the base grouping processing at step S33 are transformed to DCT vectors $U^{\xi,\zeta}_1(x), V^{\xi,\zeta}_1(y)$.

Next, in quantization processing at step S36, quantization is performed on all the DCT vectors $U^{\xi,\zeta}_1(x), V^{\xi,\zeta}_1(y)$ obtained in the DCT transform processing at step S35, thereby quantized bases $U_q^{\xi,\zeta}_1(x), V_q^{\xi,\zeta}_1(y)$ are generated. The quantization is performed as follows by using one-dimensional quantization coefficient vectors $Q_x(x)$ and $Q_y(y)$ having the same number of DCT vector elements.

$$U_q^{\xi,\zeta_l}(x) = \left\lfloor \frac{U^{\xi,\zeta_l}(x)}{Q_x(x)} \right\rfloor$$

$$V_q^{\xi,\zeta_l}(y) = \left\lfloor \frac{V^{\xi,\zeta_l}(y)}{Q_y(y)} \right\rfloor$$

$\lfloor a \rfloor$ means a maximum integer not greater than a. For example, $\lfloor 1.5 \rfloor=1$ holds. In the present embodiment, rounding down is performed as above, however, the integer may be obtained by rounding off.

As in the case of JPEG quantization coefficients, it is preferable that the quantization coefficient vectors $Q_x(x)$ and $Q_y(y)$ are increased as the x component is increased. Further, the values of the quantization coefficient vectors $Q_x(x)$ and $Q_y(y)$ may be previously determined in correspondence with the ranges of DCT vectors and resolutions obtained in the respective frequency components.

Finally, the quantized bases $U_q^{\xi,\zeta}{}_1(x)$, $V_q^{\xi,\zeta}{}_1(y)$ obtained in the quantization processing at step S36 are entropy-encoded at step S37. In the entropy coding processing, all the quantized bases $U_q^{\xi,\zeta}{}_1(x)$, $V_q^{\xi,\zeta}{}_1(y)$ are handled as data to be coded. As the method of entropy coding, well-known coding methods such as the Huffman coding or Arithmetic coding may be employed. Then, the entropy-coded quantized bases, the number of bases by window, and index information necessary for decoding such as window size, are recorded as a part of the coded data, and the process ends. The index information may be omitted if a previously-standardized index information is used.

In the third embodiment, in the DCT transform processing at step S35, discrete cosine transform is performed directly on plural discrete one-dimensional adaptive base groups $X^{\xi,\zeta}{}_1(x)$, $Y^{\xi,\zeta}{}_1(y)$, however the present invention is not limited to this arrangement. It may be arranged such that the respective one-dimensional adaptive base groups $X^{\xi,\zeta}{}_1(x)$, $Y^{\xi,\zeta}{}_1(y)$ are further divided, then the divided base groups are subjected to discrete cosine transform, quantization, and entropy coding.

To decode the coded data obtained by the above-described method to a decoded image $f_{decode}(x,y)$, the quantized bases $U_q^{\xi,\zeta}{}_1(x)$, $V_q^{\xi,\zeta}{}_1(y)$ are generated by entropy decoding and inverse-quantized while the index information is appropriately used, thereby decoded DCT vectors $U_{decode}{}^{\xi,\zeta}{}_1(x)$, $V_{decode}{}^{\xi,\zeta}{}_1(y)$ are reconstructed, and inverse discrete cosine transform is performed on the reconstructed decoded DCT vectors, thereby decoded one-dimensional adaptive bases $X_{decode}{}^{\xi,\zeta}{}_1(x)$, $Y_{decode}{}^{\xi,\zeta}{}_1(y)$ are reconstructed. Next, based on the reconstructed decoded one-dimensional adaptive bases $X_{decode}{}^{\xi,\zeta}{}_1(x)$, $Y_{decode}{}^{\xi,\zeta}{}_1(Y)$, decoded windows $W_{decode}{}^{\xi,\zeta}(x,y)$ is generated as follows.

$$W_{decode}^{\xi,\zeta}(x,y) = \sum_{n=0}^{k^{\xi,\zeta}-1} \left[ X_{decode}^{\xi,\zeta_n}(x) \cdot Y_{decode}^{\xi,\zeta_n}(y) \right]$$

In the above expression, $k^{\xi,\zeta}$ is the number of selected and corrected base groups by window. The decoded image $f_{decode}(x,y)$ is obtained by combining the generated decoded windows $W_{decode}^{\xi,\zeta}(x,y)$ generated as above.

In the third embodiment, a difference coded image is generated by obtaining a reconstructed image from the generated discrete one-dimensional adaptive base groups $X^{\xi,\zeta}{}_1(x)$, $Y^{\xi,\zeta}{}_1(y)$ as in the case of the second embodiment. As the error is absorbed by quantization, it may be arranged such that upon generation of each of the sequentially generated one-dimensional adaptive base groups, the DCT transform at step S35 and the quantization at step S36 are performed, then inverse quantization and inverse discrete cosine transform are performed on the quantized bases $U_q^{\xi,\zeta}{}_1(x)$, $V_q^{\xi,\zeta}{}_1(y)$ by a method similar to that of the decoding, thereby the reconstructed decoded one-dimensional adaptive bases $X_{decode}{}^{\xi,\zeta}{}_1(x)$, $Y_{decode}{}^{\xi,\zeta}{}_1(y)$ are generated, then a reconstructed image is obtained by using the reconstructed decoded one-dimensional adaptive bases, thereby a difference coded image is generated.

Figure 28:
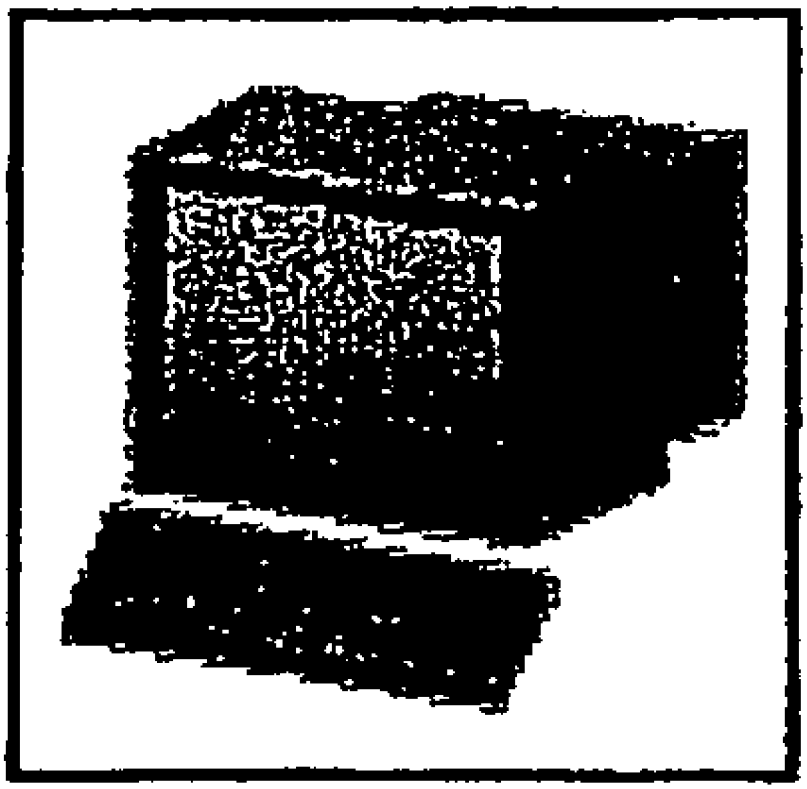
FIG. 28 shows an example of a decoded image according to the third embodiment.
Figure 29:
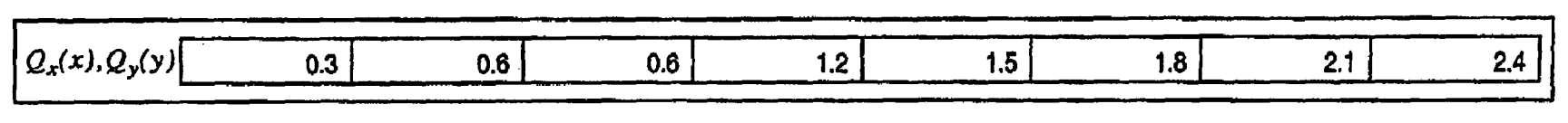

FIG. 28 shows an example of a decoded image obtained by applying the above coding and decoding to the image in FIG. 24. In the coding, the image is divided into 8×8 pixel blocks (Lx=Ly=8) and coding is performed by block. In this example, the DCT transform and the quantization are performed upon generation of each one-dimensional adaptive base group, then inverse quantization and inverse discrete cosine transform are performed, and a difference coded image is generated by using the result of inverse DCT transform. As the error due to quantization is absorbed upon generation of next one-dimensional adaptive base group, the accumulation of quantization error can be prevented. Regarding remainder(s) which occur upon division into 8×8 pixel blocks, coding is performed on the assumption that the image has all 8×8 pixel blocks and the values of portions other than the image area are "0". Further, the quantization coefficient vectors $Q_x(x)$ and $Q_y(y)$ are as shown in FIG. 29. In this case, the data amount is, including information necessary for decoding (image size: 4 bytes×2, the number of base groups of each block; 1 byte×the number of blocks [13×13 groups], quantization coefficient vectors: 4 bytes×8), 3790 bytes. That is, the data amount is further reduced while the image has quality equal to or higher than that of 8-bit rounded image in the second embodiment. In this example, the image is divided into 8×8 pixel blocks and coding is performed by block, however, other block size such as 20×20 pixels may be used upon division.

In the coding method described in the third embodiment, as in the case of the second embodiment, an input image is divided into plural windows and base grouping is performed, thereby the number of base groups corresponding to each window can be variably set. Accordingly, in a window having monotonous density distribution as shown in FIG. 5, coding with reduced error can be performed with a reduced number of base groups. On the other hand, in a window having density distribution of natural image or the like, coding can be performed with a large number of base groups. Thus the number of base groups can be optimized. Further, as the base groups are discrete cosine transformed then quantized and entropy encoded, higher efficiency coding can be realized.

As described in the third embodiment, a discrete two-dimensional gray-scale image $f(x,y)$ defined in a finite range is divided into plural blocks, then plural discrete one-dimensional adaptive base groups $X_{decode}{}^{\xi,\zeta}{}_1(x)$, $Y_{decode}{}^{\xi,\zeta}{}_1(y)$ are generated by block, and the base groups are encoded.

Fourth Embodiment

In a fourth embodiment as a modification to the third embodiment, a discrete two-dimensional gray-scale image $f(x,y)$ defined in a finite range is subjected to two-dimensional discrete cosine transform and quantization, thereby a quantized frequency image $f^{u,v}{}_1(\xi,\zeta)$ is generated, and encoded to plural discrete one-dimensional adaptive base groups $X^{u,v}{}_1(x)$, $y^{u,v}{}_1(y)$. That is, the two-dimensional image is converted to frequency component data (represented in frequency space) and subjected to the above-described coding using adaptive bases.

Figure 4:
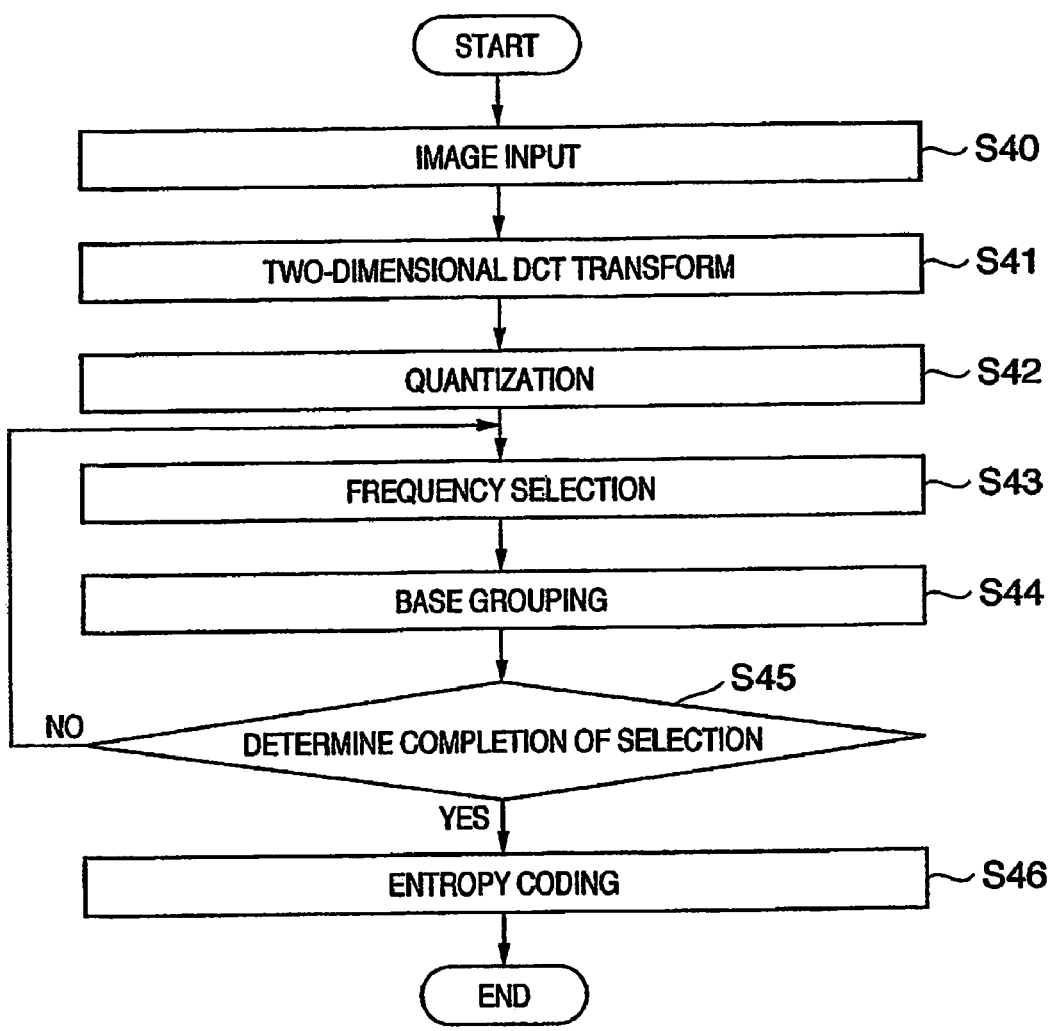
FIG. 4 is a flowchart showing coding processing according to a fourth embodiment.

In the fourth embodiment, the apparatus construction is the same as that of the first embodiment. Hereinbelow, the processing according to the fourth embodiment will be described with reference to the flowchart of FIG. 4.

First, in the image input (step S40), an input image $f(x,y)$ as a discrete two-dimensional gray-scale image to be encoded is inputted. In this embodiment, x and y have limited definition ranges similar to those in the second embodiment, and are integers as in the case of the second embodiment.

Next, two-dimensional DCT transform processing is performed (step S41). The input image f(x,y) is divided into plural images $W^{\xi,\zeta}(x,y)$ having a predetermined size of, e.g., 8×8 pixels. The divided images $W^{\xi,\zeta}(x,y)$ are similar to the windows $W^{\xi,\zeta}(x,y)$ described in the third embodiment. At step S41, two-dimensional discrete cosine transform is performed on the respective divided images $W^{\xi,\zeta}(x,y)$.

Next, the two-dimensional discrete-cosine transformed data are quantized (step S42). The quantization processing is performed by using a predetermined quantization coefficient Q(x,y), thereby quantized images $W^{\xi,\zeta}(x,y)$ are generated. That is, processings similar to the JPEG coding step of two-dimensional discrete cosine transform and quantization are performed. Since the transform is similar to the JPEG transform, the detailed explanation thereof will be omitted.

In the fourth embodiment, the input image f(x,y) is divided into 8×8 pixel sized images $W^{\xi,\zeta}(x,y)$ and subjected to two-dimensional discrete cosine transform, and subjected to quantization by using the quantization coefficient Q(x,y) to increase a value in a high frequency, however, the present invention is not particularly limited to this arrangement. For example, the input image may be divided by another size, or the quantization may be performed by using another quantization coefficient.

Next, frequency selection processing is performed (step S43). In this processing, frequency parameters u, v are selected, and a frequency image $f^{u,v}(\xi,\zeta)$ is generated. The frequency parameters u, v are integers equal to or greater than "0". As the input image f(x,y) is divided into 8×8 pixel sized images $W^{\xi,\zeta}(x,y)$ in the two-dimensional DCT transform (step S41), the parameters are integers up to "7". Accordingly, the frequency parameters u, v have values "0" to "7". In this embodiment, one of 8×8=64 parameter combinations is selected. The generated frequency image $f^{u,v}(\xi,\zeta)$ is expressed as follows using the quantized images $W_q^{\xi,\zeta}(x,y)$ generated in the quantization.

$$f^{u,v}(\xi,\zeta) = W_q^{\xi,\zeta}(x,y)$$

As expressed above, in the frequency image $f^{u,v}(\xi,\zeta)$, selected u, v frequency components in the respective quantized images $W_q^{\xi,\zeta}(x,y)$ are arrayed.

Next, in the base grouping processing (step S44), the frequency image $f^{u,v}(\xi,\zeta)$ generated in correspondence with the selected frequency parameters u, v is converted to plural discrete one-dimensional adaptive base groups $X^{u,v}_1(\xi), Y^{u,v}_1(\zeta)$. Since the processing is similar to the coding to plural one-dimensional adaptive base groups described in the second embodiment, the explanation thereof will be omitted.

In selection completion determination (step S45), it is determined whether or not all the frequency parameters u, v have been selected. In the fourth embodiment, as there are 64 combinations of frequency parameters u, v, all of the combinations are selected. When the base grouping of the frequency images $f^{u,v}(\xi,\zeta)$ corresponding to the respective frequency parameters u, v in the base grouping (step S44) has been completed, the process proceeds to entropy coding (step S46). If it is determined that all the 64 combinations of frequency parameters u, v have not been selected, the process returns to the frequency selection (step S43), in which an unselected combination of frequency parameters u, v is selected, then base grouping of the frequency image $f^{u,v}(\xi,\zeta)$ corresponding to the selected frequency parameters u, v is performed.

In the entropy coding (step S46), the base groups $X^{u,v}_1(\xi)$, $Y^{u,v}_1(\zeta)$ generated in the base grouping (step S44) are entropy encoded, then recorded, with index information necessary for reconstruction, as coded data, and the process ends. The processing is similar to that described in the third embodiment.

As in the case of the third embodiment, in the method for generating a decoded image from the coded data, first, one-dimensional base groups are reconstructed by entropy decoding with the index information, then a frequency image is reconstructed by using the base groups. Then quantized images are generated from the frequency images, then inverse-quantization is performed, and inverse two-dimensional discrete-cosine transform is performed, thereby a decoded image can be reconstructed.

In the third embodiment, the input image is spatially divided and encoded, while in the fourth embodiment, the input image is divided in frequency space and encoded. In the fourth embodiment, one-dimensional base grouping is made from the image divided in frequency space, however, it may be arranged such that the image divided in the frequency space is further spatially divided before base grouping. Further, in the entropy coding (step S46), the generated base groups are directly entropy encoded, however, it may be arranged such that the one-dimensional adaptive base groups are quantized and entropy encoded. Further, as in the case of the third embodiment, it may be arranged such that further discrete cosine transform (one-dimensional) then quantization are performed, and entropy coding is performed.

As described above, a discrete two-dimensional gray-scale image f(x,y) defined in a finite range is two-dimensional discrete-cosine transformed and quantized thereby a frequency image $f^{u,v}(\xi,\zeta)$ is generated, and encoded to plural discrete one-dimensional adaptive base groups $X^{u,v}_1(\xi), Y^{u,v}_1(\zeta)$ Fifth Embodiment In the above-described first to fourth embodiments, coding of two-dimensional data is described. However, the present invention is not limited to two-dimensional data but is applicable to other multidimensional data. In a fifth embodiment as a modification to the second embodiment, discrete three-dimensional data f(x,y,z) defined in a finite range is encoded to plural discrete one-dimensional adaptive base groups $X_1(x), Y_1(y), Z_1(z)$.

As discrete three-dimensional data to be encoded, discrete density distribution data in three-dimensional space or discrete time-series data of discrete two-dimensional gray-scale image may be used. In this embodiment, each element of the three-dimensional data (in the case of discrete time-series data of discrete two-dimensional gray-scale image, a pixel of the two-dimensional gray-scale image at predetermined time) is represented by 1 byte.

First, such three-dimensional data f(x,y,z) to be encoded is inputted. As in the case of the second embodiment, x, y, z are integers having predetermined definition ranges $0 \leq x < x_{max}$, $0 \leq y < y_{max}$, and $0 \leq z < z_{max}$. As in the case of the second embodiment, coding is performed by correcting one-dimensional adaptive base groups $X_1(x), Y_1(y), Z_1(z)$ based on the following error E and correction amounts $\Delta X_1(x), \Delta Y_1(y), \Delta Z_1(z)$.

$$E = \sum_x \sum_y \sum_z \left[ \frac{1}{2} \{ f_l(x,y,z) - \tilde{f}_l(x,y,z) \}^2 \right]$$

-continued $$\Delta X_l(x) = -\eta_x \cdot \frac{\partial E}{\partial X_l(x)}$$
$$= \eta_x \cdot \sum_y \sum_z [\{f_l(x, y, z) - \tilde{f}_l(x, y, z)\} \cdot Y_l(y) \cdot Z_l(z)]$$

$$\Delta Y_l(y) = -\eta_y \cdot \frac{\partial E}{\partial Y_l(y)}$$
$$= \eta_y \cdot \sum_x \sum_z [\{f_l(x, y, z) - \tilde{f}_l(x, y, z)\} \cdot X_l(x) \cdot Z_l(z)]$$

$$\Delta Z_l(z) = -\eta_z \cdot \frac{\partial E}{\partial Z_l(z)}$$
$$= \eta_z \cdot \sum_x \sum_y [\{f_l(x, y, z) - \tilde{f}_l(x, y, z)\} \cdot X_l(x) \cdot Y_l(y)]$$

In the above expression, $f_1(x,y,z)$ and $\tilde{f}_l(x,y,z)$ are similar to the difference coded image $f_1(x,y)$ and reconstructed image $\tilde{f}_l(x,y)$ in the second embodiment. The only difference is that the dimension is three-dimensional. Since other parameters are similar to those in the second embodiment, the explanations thereof will be omitted.

The three-dimensional data is encoded to the one-dimensional adaptive base groups $X_1(x), Y_1(y), Z_1(z)$ by correcting the one-dimensional base groups based on the error E and the correction amounts $\Delta X_1(x)$, $\Delta Y_1(y)$, $\Delta Z_1(z)$, by a similar method to that described in the second embodiment. Assuming that one-dimensional adaptive base group corrected from selected one-dimensional adaptive base group $X_1(x), Y_1(y), Z_1(z)$ are $X'_1(x), Y'_1(y), Z'_1(z)$, the correction is performed as follows.

$$X_1'(x)=X_1(x)+\Delta X_1(x)$$

$$Y_1'(y)=Y_1(y)+\Delta Y_1(y)$$

$$Z_1'(z)=Z_1(z)+\Delta Z_1(z)$$

Finally, when the error E is equal to or a predetermined value, or the number of bases becomes a predetermined number, the one-dimensional adaptive base groups $X_1(x), Y_1(y), Z_1(z)$ selected and corrected by that time are recorded, and the process ends. Since the processing here is similar to that described in the second embodiment, the detailed explanation thereof will be omitted. In this case, decoded data $f_{decode}(x,y,z)$ reconstructed from the one-dimensional adaptive base groups $X_1(x), Y_1(y), Z_1(z)$ is as follows.

$$f_{decode}(x, y, z) = \sum_{n=0}^{k-1} [X_n(x) \cdot Y_n(y) \cdot Z_n(z)]$$

In the above expression, k is the number of base groups. In this manner, even if the dimension of data to be encoded becomes higher, coding can be realized by obtaining error and correction amounts as described above. In the present embodiment, the input three-dimensional data is directly encoded to one-dimensional adaptive bases, however, as in the case of the above-described third embodiment, the three-dimensional data may be divided by a predetermined range or divided in frequency space by discrete cosine transform.

As described above, discrete three-dimensional data $f(x,y,z)$ defined in a finite range is encoded to plural discrete one-dimensional adaptive base groups $X_1(x), Y_1(y), Z_1(z)$.

Sixth Embodiment

In the above-described first to fifth embodiments, as an error evaluation function, the second power of error of each element is employed, however, the coding method of the present invention is not limited to the above evaluation function, but is applicable to other error evaluation functions. In a sixth embodiment as a modification to the second embodiment, assuming that a is reference data, i.e., data to be encoded, and b is evaluation data, i.e., data reconstructed from coded data, an error evaluation function $\Sigma\{½\times(a^2-ab)^2\}$ is employed when a discrete two-dimensional gray-scale image $f(x,y)$ defined in a finite range is encoded to plural discrete one-dimensional adaptive base groups $X_1(x), Y_1(y)$.

First, a discrete two-dimensional gray-scale image $f(x,y)$ to be encoded is inputted. As in the case of the second embodiment, x, y are integers having predetermined definition ranges $0 \leq x < x_{max}$, $0 \leq y < y_{max}$. With regard to the two-dimensional gray-scale image $f(x,y)$, coding is performed by correcting the one-dimensional adaptive base groups $X_1(x), Y_1(y)$ based on the following error E and correction amounts $\Delta X_1(x)$, $\Delta Y_1(y)$, as in the case of the second embodiment.

$$E = \sum_x \sum_y \left[\frac{1}{2}\{f_l(x, y)^2 - f_l(x, y) \cdot \tilde{f}_l(x, y)\}^2\right]$$

$$\Delta X_l(x) = -\eta_x \cdot \frac{\partial E}{\partial X_l(x)}$$
$$= \eta_x \cdot \sum_y [f_l(x, y) \cdot \{f_l(x, y) - \tilde{f}_l(x, y)\} \cdot Y_l(y)]$$

$$\Delta Y_l(y) = -\eta_y \cdot \frac{\partial E}{\partial Y_l(y)}$$
$$= \eta_y \cdot \sum_x [f_l(x, y) \cdot \{f_l(x, y) - \tilde{f}_l(x, y)\} \cdot X_l(x)]$$

In the above expression, $f_1(x,y)$ and $\tilde{f}_l(x,y)$ are similar to the difference coded image $f_1(x,y)$ and reconstructed image $\tilde{f}_l(x,y)$ in the second embodiment, therefore the explanations thereof will be omitted. Further, since other parameters are similar to those in the second embodiment, the explanations thereof will be omitted.

Based on the above error E and correction amounts $\Delta X_1(x)$, $\Delta Y_1(y)$, the one-dimensional adaptive base groups are corrected in a similar method to that described in the second embodiment, thereby coding to the one-dimensional adaptive base groups $X_1(x), Y_1(y)$ is performed. Assuming that one-dimensional adaptive base group, corrected from selected one-dimensional adaptive base group $X_1(x), Y_1(y)$, is $X'_1(x), Y'_1(y)$, and uncorrected base group is $X_1(x), Y_1(y)$, correction is performed as follows.

$$X_1'(x)=X_1(x)+\Delta X_1(x)$$

$$Y_1'(y)=Y_1(y)+\Delta Y_1(y)$$

Finally, when the error E is equal to or a predetermined value, or the number of bases becomes a predetermined number, the one-dimensional adaptive base groups $X_1(x), Y_1(y)$, selected and corrected by that time are recorded, and the process ends. Since the processing here is similar to that described in the second embodiment, the detailed explanation thereof will be omitted. In this case, decoded data $f_{decode}(x,y)$ is similar to that described in the second embodiment.

In this manner, coding is realized by using other error evaluation function than the second power error, by obtaining error and correction amounts as described above. In the sixth embodiment, the error evaluation function $\Sigma\{\frac{1}{2}\times(a^2-ab)^2\}$ is employed, however, the present invention is not limited to this error evaluation function. Any other evaluation function may be used as long as it becomes closer to coded data thereby error is reduced. For example, in the case of two-dimensional image, the divergence between difference coded image and differentiated reconstructed image may be included in the error evaluation function. It is preferable that in such error evaluation function, parameters to be corrected, i.e., partial differential with respect to $X1(x)$, $Y_1(y)$ is analytically obtained. However, if the partial differential cannot be analytically obtained, the correction amounts may be determined from increment/decrement of error when the parameters to be corrected are slightly changed.

As described above, a discrete two-dimensional gray-scale image $f(x,y)$ defined in a finite range is encoded into plural discrete one-dimensional adaptive base groups $X_1(x)$, $Y_1(y)$ by using $\Sigma\{\frac{1}{2}\times(a^2-ab)^2\}$ as an error evaluation function. Note that the sixth embodiment is particularly applied to the second embodiment, however, it is also applicable to other embodiments.

Seventh Embodiment

In the above-described first to sixth embodiments, multi-dimensional data is encoded to plural one-dimensional adaptive base groups, however, the present invention is not limited to the above coding, but is applicable to coding to other form of data. In a seventh embodiment as a modification to the second embodiment, a discrete two-dimensional gray-scale image $f(x,y)$ defined in a finite range is encoded to plural discrete two-dimensional adaptive bases $S_1(x_s,y_s)$.

First, a discrete two-dimensional gray-scale image $f(x,y)$ to be encoded is inputted. As in the case of the second embodiment, x and y are integers having predetermined definition ranges $0 \leq x < x_{max}$ and $0 \leq y < y_{max}$. Next, as a base, one discrete two-dimensional adaptive base $S_1(x_s,y_s)$ is selected. If $x_{max}$ or $Y_{max}$ is an even number, $x_s$ and $y_s$ are integers having definition ranges $0 \leq x_s < (x_{max}/2)+1$ and $0 \leq y_s < (y_{max}/2)+1$. If $x_{max}$ or $Y_{max}$ is an odd number, $x_s$ and $y_s$ are integers having definition ranges $0 \leq x_s < (x_{max}/2)+0.5$ and $0 \leq y_s < (y_{max}/2)+0.5$. Further, the suffix "1" is a base number. Although not particularly limited, the base number is sequentially selected from "0" in the present embodiment.

Next, a reconstructed image $\tilde{f}_1(x,y)$ is calculated from the selected two-dimensional adaptive base $S_1(x_s,y_s)$ having the base number "1" as follows.

$x, y$: even number     i)
$$\tilde{f}_l(x, y) = S_l\left(\frac{x}{2}, \frac{y}{2}\right)$$

$x, y$: odd number     ii)
$$\tilde{f}_l(x, y) = \frac{1}{4}\left\{\begin{array}{l} S_l\left(\frac{x-1}{2}, \frac{y-1}{2}\right) + S_l\left(\frac{x+1}{2}, \frac{y-1}{2}\right) + \\ S_l\left(\frac{x-1}{2}, \frac{y+1}{2}\right) + S_l\left(\frac{x+1}{2}, \frac{y+1}{2}\right) \end{array}\right\}$$

$x$: even number, $y$: odd number     iii)
$$\tilde{f}_l(x, y) = \frac{1}{2}\left\{S_l\left(\frac{x}{2}, \frac{y-1}{2}\right) + S_l\left(\frac{x}{2}, \frac{y+1}{2}\right)\right\}$$

-continued $x$: odd number, $y$: even number     iv)
$$\tilde{f}_l(x, y) = \frac{1}{2}\left\{S_l\left(\frac{x-1}{2}, \frac{y}{2}\right) + S_l\left(\frac{x+1}{2}, \frac{y}{2}\right)\right\}$$

The error E and correction amount $\Delta S_1(x_s,y_s)$ are calculated by using the above reconstructed image $\tilde{f}_1(x,y)$ as follows.

$$E = \sum_x \sum_y \left[\frac{1}{2}\{f_l(x,y) - \tilde{f}_l(x,y)\}^2\right]$$

$$\Delta S_l(x_s, y_s) = -\eta \cdot \frac{\partial E}{\partial S_l(x_s, y_s)}$$
$$= \eta \cdot \sum_{n=-1}^{1}\sum_{m=-1}^{1}\left[\left\{\begin{array}{l}f_l(2x_s+n, 2y_s+m) - \\ \tilde{f}_l(2x_s+n, 2y_s+m)\end{array}\right\} \cdot C(m,n)\right]$$

In the above expression, $f_1(x,y)$ is a difference coded image similar to that of the second embodiment. Further, in the expression to calculate the correction amount $\Delta S_1(x_s,y_s)$, $C(m,n)$ has the following values.

If $n=0$ and $m=0$ hold
    $C(n,m)=1$

If $n=\pm 1$ and $m=0$ hold, or $n=0$ and $m\pm 1$ hold
    $C(n,m)=0.5$

If $n=\pm 1$ and $m=\pm 10$ hold
    $C(n,m)=0.25$

Note that in the above expressions, if $2x_s+n<0$, $2x_s+n\geq x_{max}$, $2y_s+m<0$, or $2y_s+n\geq y_{max}$ holds, $C(m,n)=0$ holds.

Further, $\eta$ is a correction parameter similar to the parameters $\eta_x$ and $\eta_y$ described in the second embodiment. The correction is performed on the two-dimensional adaptive base based on the above error E and correction amount $\Delta S_1(x_s,y_s)$ in a similar method to that described in the second embodiment, thereby the input image $f(x,y)$ is encoded to the two-dimensional adaptive base $S_1(x_s,y_s)$.

Regarding the correction of the base, the selected two-dimensional adaptive base $S_1(x_s,y_s)$ is corrected as follows. In the expression, $S_1(x_s,y_s)$ is an uncorrected base prior to the correction, and $S'_1(x_s,y_s)$ is a corrected base.

$$S'_1(x_s,y_s) = S_1(x_s,y_s) + \Delta S_1(x_s,y_s)$$

Finally, when the error E is equal to or a predetermined value, or the number of bases becomes a predetermined number, the two-dimensional adaptive bases $S_1(x_s,y_s)$ selected and corrected by that time are recorded, and the process ends. Since the processing here is similar to that described in the second embodiment, the detailed explanation thereof will be omitted. In this case, a decoded image $f_{decode}(x,y)$ reconstructed from the coded data is obtained as follows.

$x, y$: even number     i)
$$f_{decode}(x, y) = \sum_{n=0}^{k-1} S_n\left(\frac{x}{2}, \frac{y}{2}\right),$$

-continued x, y: odd number  (ii)

$$f_{decode}(x, y) = \sum_{n=0}^{k-1} \left[ \frac{1}{4} \left\{ \begin{array}{l} S_n\left(\frac{x-1}{2}, \frac{y-1}{2}\right) + S_n\left(\frac{x+1}{2}, \frac{y-1}{2}\right) + \\ S_n\left(\frac{x-1}{2}, \frac{y+1}{2}\right) + S_n\left(\frac{x+1}{2}, \frac{y+1}{2}\right) \end{array} \right\} \right]$$

x: even number, y: odd number  (iii)

$$f_{decode}(x, y) = \sum_{n=0}^{k-1} \left[ \frac{1}{2} \left\{ S_n\left(\frac{x}{2}, \frac{y-1}{2}\right) + S_n\left(\frac{x}{2}, \frac{y+1}{2}\right) \right\} \right]$$

x: odd number, y: even number  (iv)

$$f_{decode}(x, y) = \sum_{n=0}^{k-1} \left[ \frac{1}{2} \left\{ S_n\left(\frac{x-1}{2}, \frac{y}{2}\right) + S_n\left(\frac{x+1}{2}, \frac{y}{2}\right) \right\} \right]$$

In the above expressions, k is a base number of selected and corrected bases. In the seventh embodiment, in the generated two-dimensional adaptive bases $S_1(x_s, y_s)$, the number of elements is about ¼ of the input image f(x,y), however, the invention is not limited to such number but it may be arranged such that coding is performed by using a two-dimensional adaptive base having a different number of elements.

As described above, in the seventh embodiment, a discrete two-dimensional gray-scale image f(x,y) defined in a finite range is encoded to plural discrete two-dimensional adaptive bases $S_1(x_s, y_s)$.

Eighth Embodiment

In the above-described first to seventh embodiments, coding is performed by using a one-dimensional adaptive base or two-dimensional adaptive base as an adaptive base, however, the coding method of the present invention is not limited to this arrangement but is applicable to adaptive base having plural parameters. In an eighth embodiment of the present invention as a modification to the second embodiment, a discrete two-dimensional gray-scale image f(x,y) defined in a finite range is encoded to an adaptive base having plural parameters.

Hereinbelow, as a particular example, coding to an adaptive base $G_1(A_1, p_1, q_1, \rho_1)$ having four parameters $A_1$, $P_1$, $q_1$ and $\rho_1$ will be described.

First, a discrete two-dimensional gray-scale image f(x,y) to be encoded is inputted. As in the case of the second embodiment, x and y are integers having predetermined definition ranges $0 \leq x < x_{max}$, $0 \leq y < y_{max}$. Next, one adaptive base $G_1$ is selected as an initial adaptive base. The suffix "1" is a base number. In the eighth embodiment, although not particularly limited, the adaptive base is sequentially selected from "0" to a predetermined number.

Next, a reconstructed image $\tilde{f}_1(x,y)$ is calculated from the selected adaptive base $G_1$ having the base number 1 as follows.

$$\tilde{f}_l(x, y) = A_l \cdot \exp\left\{ \frac{(x - p_l)^2 + (y - q_l)^2}{2\sigma_l^2} \right\}$$

Next, the error E and correction amounts $\Delta A_1$, $\Delta p_1$, $\Delta q_1$, and $\Delta \rho_1$ are calculated as follows by using the above reconstructed image $\tilde{f}_1(x,y)$.

$$E = \sum_x \sum_y \left[ \frac{1}{2} \{ f_l(x, y) - \tilde{f}_l(x, y) \}^2 \right]$$

$$\Delta A_l = -\eta_A \cdot \frac{\partial E}{\partial A_l}$$
$$= \eta_A \cdot \sum_x \sum_y \left[ \{ f_l(x, y) - \tilde{f}_l(x, y) \} \cdot \frac{\tilde{f}_l(x, y)}{A} \right]$$

$$\Delta p_l = -\eta_P \cdot \frac{\partial E}{\partial p_l}$$
$$= -\eta_P \cdot \sum_x \sum_y \left[ \{ f_l(x, y) - \tilde{f}_l(x, y) \} \cdot \tilde{f}_l(x, y) \cdot \frac{x - p_l}{\sigma^2} \right]$$

$$\Delta q_l = -\eta_q \cdot \frac{\partial E}{\partial q_l}$$
$$= -\eta_q \cdot \sum_x \sum_y \left[ \{ f_l(x, y) - \tilde{f}_l(x, y) \} \cdot \tilde{f}_l(x, y) \cdot \frac{y - q_l}{\sigma^2} \right]$$

$$\Delta \sigma_l = -\eta_\sigma \cdot \frac{\partial E}{\partial \sigma_l}$$
$$= -\eta_\sigma \cdot \sum_x \sum_y \left[ \begin{array}{l} \{ f_l(x, y) - \tilde{f}_l(x, y) \} \cdot \\ \tilde{f}_l(x, y) \cdot \frac{(x - p_l)^2 + (y - q_l)^2}{\sigma^3} \end{array} \right]$$

In the above expression, $f_1(x,y)$ is a difference coded image similar to that of the second embodiment. Further, $\eta_A$, $\eta_p$, $\eta_q$ and $\eta_\sigma$ are correction parameters similar to the parameters $\eta_x$ and $\eta^y$ described in the second embodiment. Based on the above error E and the correction amounts $\Delta A_1$, $\Delta p_1$, $\Delta q_1$, and $\Delta \rho_1$, the respective parameters constructing the adaptive base are corrected by a similar method to that of the second embodiment, thereby coding to the adaptive base $G_1$ is performed.

Regarding the correction of the adaptive base, the respective parameters $A_1$, $p_1$, $q_1$ and $\rho_1$, constructing the selected base $G_1$ are corrected as follows. $A'_1$, $p'_1$, $q'_1$ and $\rho'_1$ are corrected parameters, and $A_1$, $p_1$, $q_1$ and $\rho_1$ are uncorrected parameters.

$$A'_1 = A_1 + \Delta A_1$$

$$p'_1 = p_1 + \Delta p_1$$

$$q'_1 = q_1 + \Delta q_1$$

$$\rho'_1 = \rho_1 + \Delta \rho_1$$

Finally, when the error E is equal to or less than a predetermined value, or the base number becomes a predetermined number, the respective parameters $A_1$, $p_1$, $q_1$, and $\rho_1$ constructing the adaptive bases $G_1$ selected and corrected by that time are record-outputted, and the process ends. Since the processing here is similar to that described in the second embodiment, the detailed explanation thereof will be omitted. In this case, a decoded image $f_{decode}(x,y)$ reconstructed from the coded data is obtained as follows.

$$f_{decode}(x, y) = \sum_{n=0}^{k-1} \left[ A_n \cdot \exp\left\{ \frac{(x - p_n)^2 + (y - q_n)^2}{2\sigma_n^2} \right\} \right]$$

In the above expression, k is a base number of selected and corrected bases. In the eighth embodiment, the adaptive base $G_1$ having four parameters is used, however, the present invention is not limited to this number of parameters, but it may be arranged such that coding is performed by using an adaptive base having a different number of parameters.

As described above, a discrete two-dimensional gray-scale image f(x,y) defined in a finite range is encoded to adaptive base $G_1$ having plural parameters.

Ninth Embodiment

In a ninth embodiment, discrete convolution operation to two-dimensional distribution data as predetermined two-dimensional weight distribution data is performed. The two-dimensional weight distribution data is transformed by the data coding according to the second embodiment to one-dimensional adaptive base group, and discrete convolution operation is performed on the two-dimensional distribution data by using the one-dimensional adaptive base group. The discrete convolution can be used in, e.g., calculation in one feature detection cell face in Convolutional Neural Networks (LeCun, Y. and Bengio, Y., 1995, "Convolutional Networks for Images Speech, and Time Series" in Handbook of Brain Theory and Neural Networks (M. Arbib, Ed.), MIT Press, pp. 255-258). In this case, the two-dimensional weight distribution data can be regarded as synapse weight distribution.

First, discrete two-dimensional weight distribution data w(x,y) to be subjected to discrete convolution is inputted. As the two-dimensional weight distribution data is discrete, x and y are integers. Note that if the two-dimensional weight distribution data w(x,y) is k-dimensional weight distribution data, the data is expressed as $w(x_1, x_2, \ldots, x_k)$. Further, if the two-dimensional distribution data is k-dimensional distribution data, the data is expressed as $A(x_1, x_2, \ldots, x_k)$. In the present embodiment, the two-dimensional distribution data is expressed as f(x,y). The result of discrete convolution to the two-dimensional distribution data f(x,y) as two-dimensional weight distribution data is expressed as follows.

$$Z(x, y) = \sum_u \sum_v \{w(u, v) \cdot f(u + x, v + y)\}$$

Next, a one-dimensional adaptive base group $X_1(x), Y_1(y)$ is generated from the inputted two-dimensional weight distribution data w(x,y) by a similar method to that described in the second embodiment. The suffix "1" of the one-dimensional adaptive base group $X_1(x), Y_1(y)$ is a base number. As detailed explanations here are similar to those in the second embodiment, the explanations will be omitted. The one-dimensional adaptive base group is not necessarily generated upon each convolution, but it may be arranged such that the one-dimensional adaptive base group is previously generated by the method described in the second embodiment, and the generated one-dimensional adaptive base group is recorded.

The result of discrete convolution to the two-dimensional distribution data f(x,y) by using the generated one-dimensional adaptive base group is as follows.

$$Z(x, y) = \sum_l \left[ \sum_u \sum_v \{X_l(u) \cdot Y_l(v) \cdot f(u + x, v + y)\} \right]$$

Figure 6:
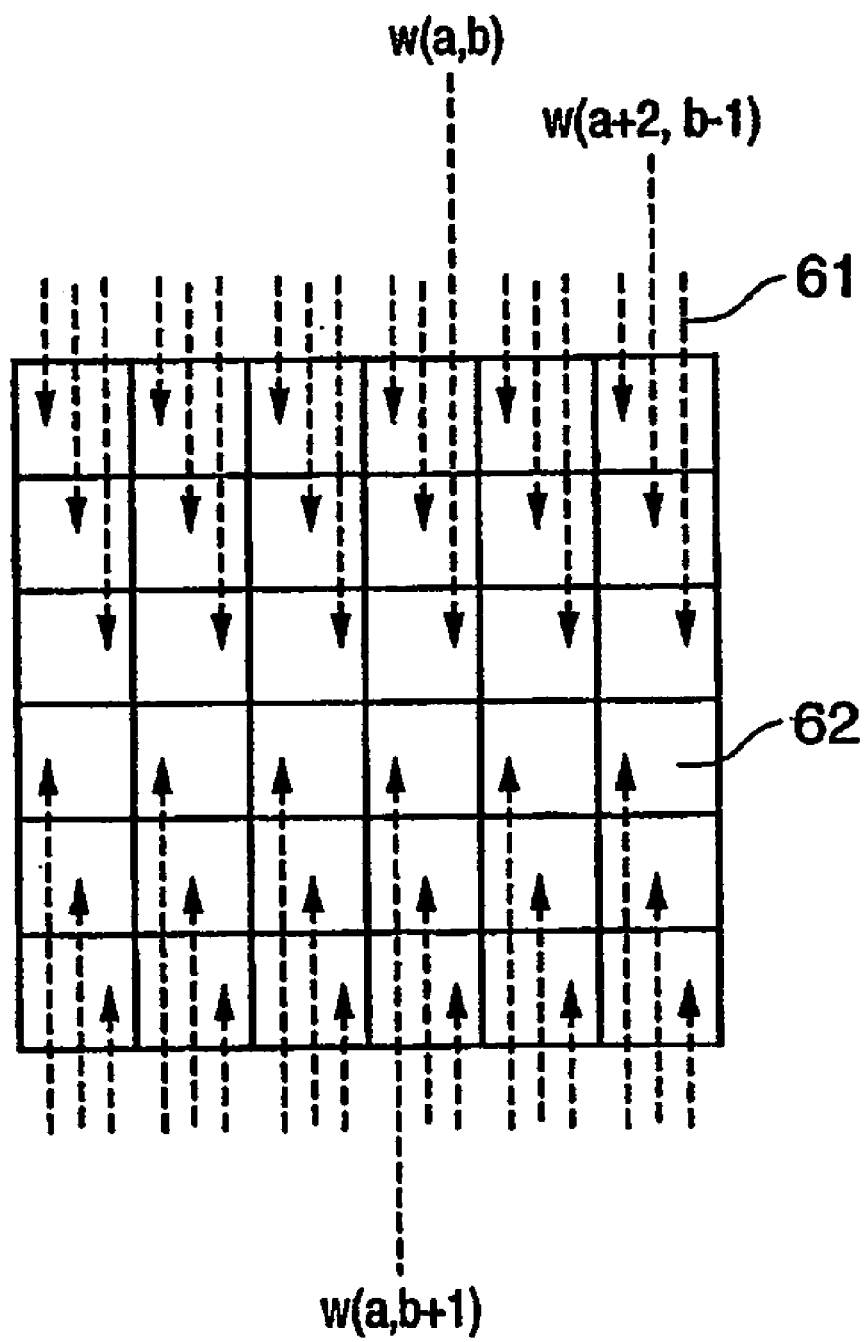
FIG. 6 is an explanatory diagram showing a conventional structure for transmission of two-dimensional weight distribution data.
Figure 7:
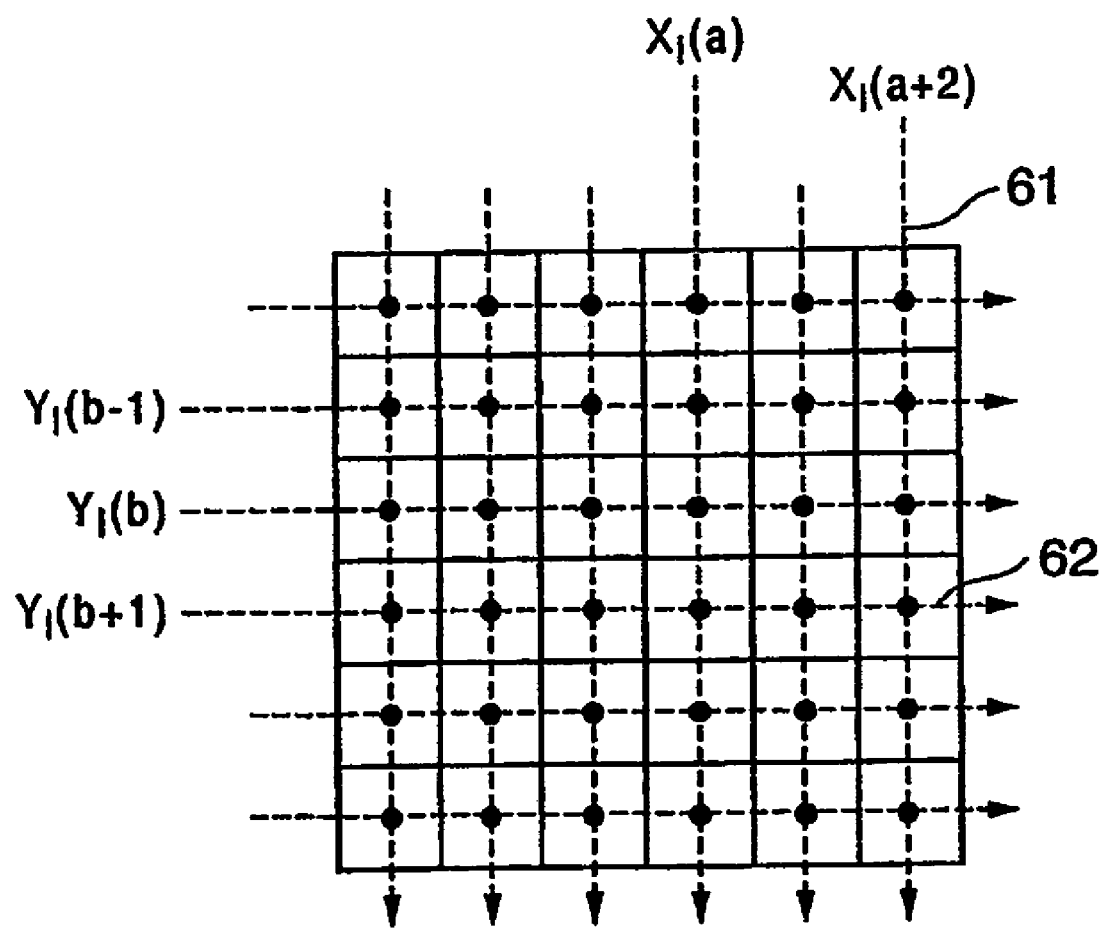
FIG. 7 is an explanatory diagram showing a structure for transmission of two-dimensional weight distribution data in a convolution arithmetic unit to perform product-sum arithmetic method according to a ninth embodiment.
Figure 9:
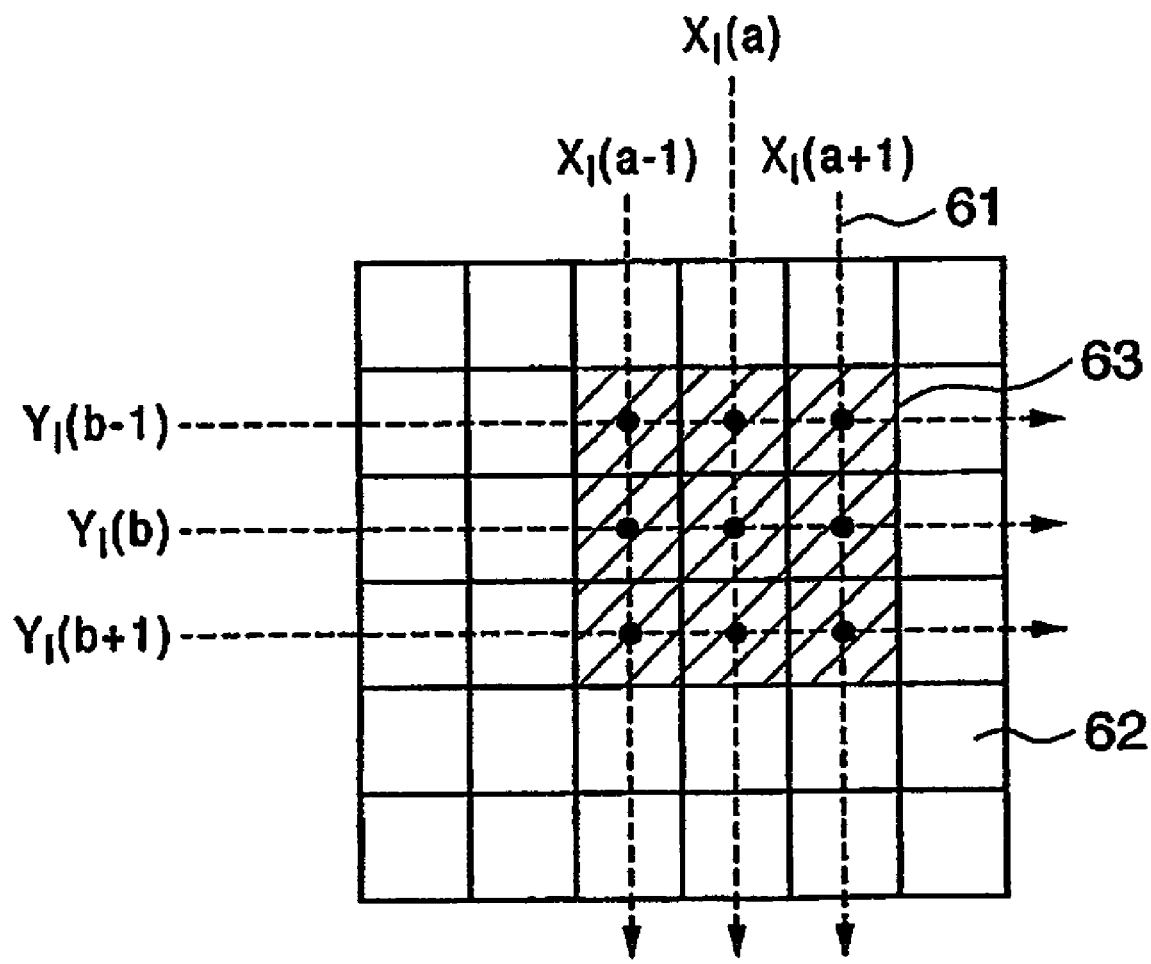
FIG. 9 is an explanatory diagram showing a structure for transmission of two-dimensional weight distribution data in the convolution arithmetic unit to perform the product-sum arithmetic method according to the ninth embodiment.

In conventional art as shown in FIG. 6, in discrete convolution of two-dimensional weight distribution data having 6×6 elements, two-dimensional weight distribution data values are independently given to the total thirty-six elements in the respective coordinates, i.e., the two-dimensional weight distribution data values are sent as signals to the respective coordinates, thirty-six signal lines are required. On the other hand, in the present embodiment, as the two-dimensional weight distribution data w(x,y) is decomposed to the one-dimensional adaptive base group $X_1(x), Y_1(y)$ and discrete convolution is performed by using the one-dimensional adaptive base group, the required number of signal lines is twelve as shown in FIG. 7. In this manner, the conventional problem of wiring in the convolution arithmetic unit can be solved. Note that in a convolution arithmetic unit having an array of product-sum arithmetic elements for execution of the above discrete convolution, the computation may be performed by inputting the one-dimensional adaptive base group $X_1(x), Y_1(y)$ into all the columns and rows of the array, as shown in FIG. 7, otherwise, by inputting the one-dimensional adaptive base group $X_1(x), Y_1(y)$ into respectively only a part of the columns and rows, and by performing computation in only a part of area (63) of the array where both of $X_1(x), Y_1(y)$ are inputted, as shown in FIG. 9.

As described above, in discrete convolution to two-dimensional distribution data as predetermined two-dimensional weight distribution data, the two-dimensional weight distribution data is converted to one-dimensional adaptive base group by the data coding method according to the second embodiment, and discrete convolution is performed on the two-dimensional distribution data by using the one-dimensional adaptive base group.

In the above embodiment, k-dimensional data $w(x_1, x_2, \ldots, x_k)$ is encoded by the above-described coding method, thereby at least a set of k one-dimensional adaptive base groups $X_{1l}(x_1), X_{2l}(x_2), \ldots, x_{kl}(X_k)$ is obtained. Further, the result y of the product-sum operation using the above k-dimensional data $A(x_1, x_2, \ldots, x_k)$ and the above one-dimensional adaptive base group is calculated as follows;

$$y = \sum_l \left[ \frac{\int \int \ldots \int A(x_1, x_2, \ldots, x_k) \cdot}{\prod_k x_{kl}(x_k) dx_1 dx_2 \ldots dx_k} \right]$$

By the above calculation, the result y can be efficiently obtained by product-sum operation between the k-dimensional data $w(x_1, x_2, \ldots, x_k)$ and the k-dimensional data $A(x_1, x_2, \ldots, x_k)$ as follows.

$$y = \int \int \cdots \int A(x_1, x_2, \ldots, x_k) \cdot w(x_1, x_2, \ldots, x_k) dx_1 dx_2 \ldots dx_k$$

In addition to the embodiments of the present invention as described above, as it is apparent that the present invention can be realized by a computer program as shown in FIG. 8, such computer program is included in the scope of the present invention. Generally, a computer program is stored in a computer-readable storage medium such as a CD-ROM, and when the medium is set in a storage medium drive device of a computer then the program is copied or installed to the system, the program becomes executable. Accordingly, such computer-readable storage medium is also included in the scope of the present invention.

As described above, according to the embodiments, n data to be encoded can be encoded to data of efficient representation format (format using adaptive base). For this purpose, the adaptive base is set, then n data are reconstructed by using the adaptive base, and the error between the n data to be encoded and the reconstructed n data is calculated by using a predetermined error evaluation function, and the adaptive base is corrected based on the error.

As described above, according to the present invention, high-efficient data coding, more particularly, coding of distribution data in multidimensional space such as a two-dimensional image can be realized. Further, as two-dimensional data can be decomposed to one-dimensional base data, the conventional problem in convolution arithmetic unit, i.e., the problem of wiring of two-dimensionally parallelized array, can be solved.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application No. 2004-024485 filed on Jan. 30, 2004 and Japanese Patent Application No. 2004-239792 filed on Aug. 19, 2004, the entire contents of which are hereby incorporated by reference herein.

The invention claimed is:

1. A method for encoding two-dimensional data f(m, n) including m×n elements to be encoded into a plurality of adaptive bases, each adaptive base including a one-dimensional array variable X(m) storing m data and a one-dimensional array variable Y(n) storing n data, comprising:
   (a) an initializing step of allocating an i-th adaptive base in a memory and initializing the i-th adaptive base by setting a random value into the one-dimensional array variable $X_i(\ )$ and the one-dimensional array variable $Y_i(\ )$, where "i" is "1" in an initial stage;
   (b) a reconstruction step of reconstructing two-dimensional data f'(m, n) including m×n elements from the adaptive bases represented by $\{X_1(\ ), Y_1(\ )\}, \ldots, \{X_i(\ ), Y_i(\ )\}$ using a predetermined conversion;
   (c) an error calculation step of calculating an error between two-dimensional data f(m, n) to be encoded and the reconstructed two-dimensional data f'(m,n) using a predetermined error evaluation function;
   (d) a correction step of correcting the i-th adaptive base by correcting the one-dimensional array variable $X_i(\ )$ and the one-dimensional array variable $Y_i(\ )$ based on said error calculated in said step (c);
   (e) a step of determining if said error calculated in said error calculation step (c) has converged;
   (f) a step of, if it is determined in said step (e) that said error has not converged, repeatedly performing the processing of steps (b)-(e);
   (g) a step of, if it is determined in said step (e) that said error has converged, determining if said error is larger than a predetermined admissible error;
   (h) a step of, if it is determined in said step (g) that said error is not larger than the predetermined admissible error, outputting array variables $\{X_1(\ ), Y_1(\ )\}, \ldots, \{X_i(\ ), Y_i(\ )\}$ of the first to i-th adaptive bases stored in the memory as encoded data; and
   (i) a step of, if it is determined in said step (g) that said error is larger than the predetermined admissible error, increasing the variable "i" to prepare a new adaptive base and repeatedly performing processing after said step (a).

2. The method according to claim 1, wherein the predetermined error evaluation function calculates a total of a second power of the error between each of the elements of the data f(m, n) to be encoded and each of the elements of the reconstructed data f(m, n).

3. The method according to claim 1, wherein in said collection step (d), the one-dimensional array variable $X_i(\ )$ and the one-dimensional array variable $Y_i(\ )$ of the i-th adaptive base are corrected so as to reduce the error.

4. The method according to claim 1, wherein in said correction step (d), the correction amount for the i-th adaptive base is obtained by multiplying a predetermined coefficient to a partial differentiation coefficient of element to be corrected in the i-th adaptive base.

5. The method according to claim 4, wherein the predetermined coefficient is a negative constant.

6. The method according to claim 4, wherein the predetermined coefficient is a negative value and is changed so as to approximate it to "0" in stages.

7. The method according to claim 1, wherein the data f(m, n) to be encoded is divided into at least one unit of a predetermined range, and the encoding is made for each predetermined range.

8. The method according to claim 1, wherein the data f(m, n) to be encoded is divided spatially into at least one unit of a predetermined space, and the encoding is made for each predetermined space.

9. A encoding apparatus for encoding two-dimensional data f(m, n) including m×n elements into adaptive bases, each adaptive base including a one-dimensional array variable X(m) storing m data and a one-dimensional array variable Y(n) storing n data, comprising:
   initializing means for allocating i-th adaptive base in a memory and initializing the i-th adaptive base by setting random values into the one-dimensional array variable $X_i(\ )$ and the one-dimensional array variable $Y_i(\ )$, where "i" is "1" in an initial stage;
   reconstruction means for reconstructing two-dimensional f'(m, n) data including m×n elements from the first to i-th adaptive bases represented by $\{X_1(\ ), Y_1(\ )\}, \ldots, \{X_i(\ ), Y_i(\ )\}$, using a predetermined conversion;
   error calculation means for calculating an error between the f(m, n) data to be encoded and the reconstructed f'(m, n) data by using a predetermined error evaluation function;
   correction means for correcting the i-th adaptive base by correcting the one-dimensional array variable $X_i(\ )$ and the one-dimensional away variable $Y_i(\ )$ based on the error calculated by said error calculation means;
   first determination means for determining if the error calculated by said error calculation means has converged,
   first control means for, if said first determination means determines that the error has not converged, repeatedly controlling said reconstruction means, error calculation means, correction means and first determination means to perform each processing;
   second determination means for, if said first determination means determines that the error has converged, determining if the error is larger than a predetermined admissible error;
   output means for, if said second output means determines that the error is not larger than the predetermined admissible error, outputting away variables $\{X_1(\ ), Y_1(\ )\}, \ldots, \{X_i(\ ), Y_i(\ )\}$ of the first to i-th adaptive bases stored in the memory as encoded data; and
   second control means for, if said second determination means determines that the error is larger than the predetermined admissible error, increasing the variable "i" to prepare a new adaptive base and repeatedly controlling said initializing means, reconstruction means, error calculation means, correction means, first determination means, first control means, second determination means and output means to perform each processing.

* * * * *